US012172400B2

(12) United States Patent
Kurtz et al.

(10) Patent No.: US 12,172,400 B2
(45) Date of Patent: Dec. 24, 2024

(54) METHOD FOR THE MANUFACTURE OF A PLASTIC COMPONENT, PLASTIC COMPONENT, AND SHOE

(71) Applicant: adidas AG, Herzogenaurach (DE)

(72) Inventors: Maximilian Philipp Kurtz, Würzburg (DE); Victor Romanov, Wertheim (DE); Norbert Reuber, Rothenfels (DE); Tru Huu Minh Le, Erlangen (DE); Andreas Johannes Seefried, Veitsbronn (DE); Christopher Robertson, Nuremberg (DE); Christopher Edward Holmes, Veitsbronn (DE); Amir Fathi, Erlangen (DE)

(73) Assignee: adidas AG, Herzogenaurach (DE)

( * ) Notice: Subject to any disclaimer, the term of this patent is extended or adjusted under 35 U.S.C. 154(b) by 71 days.

(21) Appl. No.: 16/918,241

(22) Filed: Jul. 1, 2020

(65) Prior Publication Data

US 2021/0016531 A1    Jan. 21, 2021

Related U.S. Application Data

(63) Continuation of application No. 15/829,230, filed on Dec. 1, 2017, now Pat. No. 10,730,259.

(30) Foreign Application Priority Data

Dec. 1, 2016 (DE) .......................... 102016223980.5

(51) Int. Cl.
  *B29D 35/14* (2010.01)
  *A43B 13/04* (2006.01)
  (Continued)

(52) U.S. Cl.
  CPC ............ *B29D 35/142* (2013.01); *A43B 13/04* (2013.01); *A43B 13/125* (2013.01);
  (Continued)

(58) Field of Classification Search
  None
  See application file for complete search history.

(56) References Cited

U.S. PATENT DOCUMENTS

| 1,855,098 | A | 4/1932 | Collins |
|---|---|---|---|
| 2,787,809 | A | 4/1957 | Stastny |

(Continued)

FOREIGN PATENT DOCUMENTS

| AT | 505333 A1 | 12/2008 |
|---|---|---|
| CN | 1087573 | 6/1994 |

(Continued)

OTHER PUBLICATIONS

Machine English translation of JPH10138252, accessed Mar. 21, 2022 (Year: 1998).*

(Continued)

*Primary Examiner* — Jacob T Minskey
*Assistant Examiner* — Adrianna N Konves
(74) *Attorney, Agent, or Firm* — Kilpatrick Townsend & Stockton LLP

(57) ABSTRACT

Described are methods for the manufacture of a plastic component, in particular a cushioning element for sports apparel, a plastic component manufactured with such a method, for example a sole or a part of a sole for a shoe, and a shoe with such a sole. According to an aspect of the invention, a method for the manufacture of a plastic component, in particular a cushioning element for sports apparel, is provided which includes loading a mold with a first material which includes particles of an expanded material, and, during loading the mold, pre-heating the particles by (Continued)

supplying energy, wherein the energy is supplied in the form of at least one electromagnetic field.

20 Claims, 11 Drawing Sheets

(51) Int. Cl.
| | |
|---|---|
| A43B 13/12 | (2006.01) |
| A43B 13/18 | (2006.01) |
| B29C 35/08 | (2006.01) |
| B29C 44/34 | (2006.01) |
| B29C 44/58 | (2006.01) |
| B29C 67/20 | (2006.01) |
| B29D 35/00 | (2010.01) |
| B29D 35/12 | (2010.01) |
| B29C 43/02 | (2006.01) |
| B29C 44/44 | (2006.01) |
| B29K 67/00 | (2006.01) |
| B29K 75/00 | (2006.01) |
| B29K 77/00 | (2006.01) |
| B29K 101/12 | (2006.01) |
| B29K 105/00 | (2006.01) |
| B29K 105/04 | (2006.01) |
| B29L 31/50 | (2006.01) |

(52) U.S. Cl.
CPC ........ *A43B 13/187* (2013.01); *B29C 35/0805* (2013.01); *B29C 44/3426* (2013.01); *B29C 44/585* (2013.01); *B29C 67/205* (2013.01); *B29D 35/0054* (2013.01); *B29D 35/0063* (2013.01); *B29D 35/122* (2013.01); *B29D 35/148* (2013.01); *B29C 2035/0822* (2013.01); *B29C 2035/0827* (2013.01); *B29C 2035/0855* (2013.01); *B29C 2035/0861* (2013.01); *B29C 43/02* (2013.01); *B29C 44/445* (2013.01); *B29K 2067/003* (2013.01); *B29K 2067/006* (2013.01); *B29K 2067/046* (2013.01); *B29K 2075/00* (2013.01); *B29K 2077/00* (2013.01); *B29K 2101/12* (2013.01); *B29K 2105/0005* (2013.01); *B29K 2105/002* (2013.01); *B29K 2105/048* (2013.01); *B29K 2995/0063* (2013.01); *B29K 2995/0082* (2013.01); *B29K 2995/0094* (2013.01); *B29L 2031/504* (2013.01)

(56) References Cited

U.S. PATENT DOCUMENTS

| | | | |
|---|---|---|---|
| 3,058,162 A | 10/1962 | Grabowski | |
| 3,193,876 A * | 7/1965 | Thompson | B29C 44/445 425/444 |
| 3,315,317 A | 4/1967 | Winkler | |
| 3,413,682 A | 12/1968 | Roland | |
| 3,424,827 A | 1/1969 | Galizia et al. | |
| 3,598,672 A | 8/1971 | Heller | |
| 3,813,201 A | 5/1974 | Frederick et al. | |
| 4,035,216 A | 7/1977 | Immel | |
| 4,298,324 A * | 11/1981 | Soulier | B29C 33/56 425/174.8 E |
| 4,441,876 A | 4/1984 | Marc | |
| 4,483,809 A | 11/1984 | Ando et al. | |
| 4,902,721 A | 2/1990 | Pham et al. | |
| 5,082,436 A | 1/1992 | Choi et al. | |
| 5,156,754 A * | 10/1992 | Nomura | B29C 33/3842 249/134 |
| 5,194,190 A | 3/1993 | Kim | |
| 5,314,927 A | 5/1994 | Kondo et al. | |
| 5,396,249 A | 3/1995 | Yamada et al. | |
| 5,518,060 A | 5/1996 | Cleary et al. | |
| 5,667,737 A | 9/1997 | Wittmann | |
| 5,718,968 A | 2/1998 | Cutler et al. | |
| 5,736,167 A | 4/1998 | Chang | |
| 5,937,265 A | 8/1999 | Pratt et al. | |
| 6,042,764 A | 3/2000 | Eder et al. | |
| 6,086,808 A | 7/2000 | Sorensen et al. | |
| 6,165,300 A | 12/2000 | Elsner et al. | |
| 6,253,159 B1 | 6/2001 | Bett et al. | |
| 6,346,210 B1 | 2/2002 | Swartz et al. | |
| 6,432,320 B1 | 8/2002 | Bonsignore et al. | |
| 6,464,922 B1 | 10/2002 | Bogdan | |
| 6,800,227 B1 | 10/2004 | Nohara et al. | |
| D709,680 S | 7/2014 | Herath | |
| 8,922,641 B2 | 12/2014 | Bertin et al. | |
| 8,958,901 B2 | 2/2015 | Regan | |
| D740,003 S | 10/2015 | Herath | |
| D740,004 S | 10/2015 | Hoellmueller et al. | |
| 9,212,270 B2 | 12/2015 | Fubl et al. | |
| D758,056 S | 6/2016 | Galway et al. | |
| 9,498,927 B2 | 11/2016 | Watkins et al. | |
| D776,410 S | 1/2017 | Galway et al. | |
| D783,264 S | 4/2017 | Hoellmueller et al. | |
| 9,610,746 B2 | 4/2017 | Wardlaw et al. | |
| 9,681,709 B2 | 6/2017 | Manz et al. | |
| 9,781,970 B2 | 10/2017 | Wardlaw et al. | |
| 9,781,974 B2 | 10/2017 | Reinhardt et al. | |
| 9,788,598 B2 | 10/2017 | Reinhardt | |
| 9,788,606 B2 | 10/2017 | Reinhardt et al. | |
| 9,795,186 B2 | 10/2017 | Reinhardt et al. | |
| 9,820,528 B2 | 11/2017 | Reinhardt et al. | |
| 9,849,645 B2 | 12/2017 | Wardlaw et al. | |
| 9,930,928 B2 | 4/2018 | Whiteman et al. | |
| 9,968,157 B2 | 5/2018 | Wardlaw et al. | |
| 10,039,342 B2 | 8/2018 | Reinhardt et al. | |
| D828,686 S | 9/2018 | Hoellmueller et al. | |
| D828,991 S | 9/2018 | Herath | |
| 10,259,183 B2 | 4/2019 | Wardlaw et al. | |
| D851,889 S | 6/2019 | Dobson et al. | |
| D852,475 S | 7/2019 | Hoellmueller et al. | |
| D853,691 S | 7/2019 | Coonrod et al. | |
| D853,699 S | 7/2019 | Coonrod et al. | |
| 10,357,904 B2 | 7/2019 | Farris et al. | |
| D855,297 S | 8/2019 | Motoki | |
| D873,543 S | 1/2020 | Coonrod et al. | |
| D875,359 S | 2/2020 | Dobson et al. | |
| 10,759,096 B2 | 9/2020 | Smith et al. | |
| 2001/0013459 A1 | 8/2001 | Pattantyus-abraham et al. | |
| 2001/0048182 A1 | 12/2001 | Caretta et al. | |
| 2002/0170650 A1 | 11/2002 | Chi | |
| 2003/0232933 A1 | 12/2003 | Lagneaux et al. | |
| 2004/0030435 A1 | 2/2004 | Popp et al. | |
| 2004/0032042 A1 | 2/2004 | Chi | |
| 2004/0222554 A1 | 11/2004 | Akopyan | |
| 2005/0110183 A1 | 5/2005 | Buchel et al. | |
| 2005/0116372 A1 | 6/2005 | Bruning et al. | |
| 2005/0144034 A1 | 6/2005 | Hunter | |
| 2006/0043645 A1 | 3/2006 | Goettsch et al. | |
| 2007/0029698 A1 | 2/2007 | Rynerson et al. | |
| 2008/0224357 A1 | 9/2008 | Allmendinger et al. | |
| 2008/0277837 A1 | 11/2008 | Liu et al. | |
| 2008/0282579 A1 | 11/2008 | Bobbett et al. | |
| 2009/0013558 A1 | 1/2009 | Hazenberg et al. | |
| 2009/0072436 A1 | 3/2009 | Dean | |
| 2009/0142563 A1 | 6/2009 | Zorn et al. | |
| 2010/0222442 A1 | 9/2010 | Prissok et al. | |
| 2010/0239803 A1 | 9/2010 | Farkas et al. | |
| 2010/0267850 A1 | 10/2010 | Yoshida et al. | |
| 2011/0232008 A1 | 9/2011 | Crisp | |
| 2011/0266717 A1 | 11/2011 | Nehls et al. | |
| 2011/0297590 A1 | 12/2011 | Ackley et al. | |
| 2012/0056345 A1 | 3/2012 | Lee | |
| 2012/0205435 A1 | 8/2012 | Woerz et al. | |
| 2013/0125319 A1 | 5/2013 | Regan | |
| 2013/0126075 A1 | 5/2013 | Jiang | |
| 2013/0150468 A1 | 6/2013 | Fuessi et al. | |
| 2013/0203879 A1 | 8/2013 | Rensen et al. | |
| 2013/0266792 A1 | 10/2013 | Nohara et al. | |
| 2013/0267639 A1 | 10/2013 | Zhuang et al. | |

(56) References Cited

U.S. PATENT DOCUMENTS

| | | |
|---|---|---|
| 2013/0333950 A1 | 12/2013 | Atkins et al. |
| 2014/0017450 A1 | 1/2014 | Baghdadi et al. |
| 2014/0110491 A1 | 4/2014 | Roberts, Jr. |
| 2014/0189964 A1 | 7/2014 | Wen et al. |
| 2014/0227505 A1 | 8/2014 | Schiller et al. |
| 2014/0243442 A1 | 8/2014 | Coles et al. |
| 2014/0259753 A1 | 9/2014 | Watkins et al. |
| 2014/0275306 A1 | 9/2014 | Watkins et al. |
| 2015/0038605 A1 | 2/2015 | Baghdadi |
| 2015/0076236 A1 | 3/2015 | Chen |
| 2015/0101133 A1 | 4/2015 | Manz et al. |
| 2015/0119482 A1 | 4/2015 | Kumar et al. |
| 2015/0166270 A1 | 6/2015 | Buscher et al. |
| 2015/0174808 A1 | 6/2015 | Rudolph et al. |
| 2015/0190830 A1 | 7/2015 | Regan et al. |
| 2015/0197617 A1 | 7/2015 | Prissok et al. |
| 2015/0237823 A1 | 8/2015 | Schmitt et al. |
| 2015/0344661 A1 | 12/2015 | Spies et al. |
| 2015/0366289 A1 | 12/2015 | Rustam et al. |
| 2016/0001476 A1 | 1/2016 | Sommer et al. |
| 2016/0015120 A1 | 1/2016 | Denison et al. |
| 2016/0037859 A1 | 2/2016 | Smith et al. |
| 2016/0039162 A1 | 2/2016 | Murphy et al. |
| 2016/0046751 A1 | 2/2016 | Spies et al. |
| 2016/0121524 A1 | 5/2016 | Daeschlein et al. |
| 2016/0128426 A1 | 5/2016 | Reinhardt et al. |
| 2016/0200011 A1 | 7/2016 | Rothfuss et al. |
| 2016/0227876 A1 | 8/2016 | Le et al. |
| 2016/0244583 A1 | 8/2016 | Keppeler |
| 2016/0244584 A1 | 8/2016 | Keppeler |
| 2016/0244587 A1 | 8/2016 | Gutmann et al. |
| 2016/0278481 A1 | 9/2016 | Le et al. |
| 2016/0295955 A1 | 10/2016 | Wardlaw et al. |
| 2016/0302508 A1 | 10/2016 | Kormann et al. |
| 2016/0311993 A1 | 10/2016 | Zhang et al. |
| 2016/0332379 A1 | 11/2016 | Paternoster et al. |
| 2016/0346627 A1 | 12/2016 | Le et al. |
| 2017/0015825 A1 | 1/2017 | Ting et al. |
| 2017/0173910 A1 | 6/2017 | Wardlaw et al. |
| 2017/0259474 A1 | 9/2017 | Holmes et al. |
| 2017/0340067 A1 | 11/2017 | Dyckmans et al. |
| 2017/0341325 A1 | 11/2017 | Le et al. |
| 2017/0341326 A1 | 11/2017 | Holmes et al. |
| 2017/0341327 A1 | 11/2017 | Le et al. |
| 2018/0000197 A1 | 1/2018 | Wardlaw et al. |
| 2018/0035755 A1 | 2/2018 | Reinhardt et al. |
| 2018/0093437 A1 | 4/2018 | Wardlaw et al. |
| 2018/0154598 A1 | 6/2018 | Kurtz et al. |
| 2018/0206591 A1 | 7/2018 | Whiteman et al. |
| 2018/0235310 A1 | 8/2018 | Wardlaw et al. |
| 2018/0290349 A1 | 10/2018 | Kirupananthan et al. |
| 2018/0303198 A1 | 10/2018 | Reinhardt et al. |
| 2019/0021435 A1 | 1/2019 | Kormann et al. |
| 2019/0291371 A1 | 9/2019 | Wardlaw et al. |
| 2020/0044326 A1 | 2/2020 | Olfert et al. |
| 2020/0060383 A1 | 2/2020 | Le et al. |
| 2020/0113280 A1 | 4/2020 | Wardlaw et al. |
| 2020/0221820 A1 | 7/2020 | Le et al. |
| 2020/0230905 A1 | 7/2020 | Le et al. |
| 2020/0253328 A1 | 8/2020 | Reinhardt et al. |
| 2020/0307041 A1 | 10/2020 | Reuber et al. |
| 2020/0315290 A1 | 10/2020 | Reinhardt et al. |
| 2021/0113893 A1 | 4/2021 | Le et al. |
| 2021/0161249 A1 | 6/2021 | Smith et al. |
| 2021/0195985 A1 | 7/2021 | Kormann et al. |
| 2021/0219655 A1 | 7/2021 | Duemler et al. |

FOREIGN PATENT DOCUMENTS

| | | |
|---|---|---|
| CN | 2501679 Y | 7/2002 |
| CN | 101060963 A | 10/2007 |
| CN | 101611082 A | 12/2009 |
| CN | 202895563 U | 4/2013 |
| CN | 103507208 A | 1/2014 |
| CN | 103978620 | 8/2014 |
| CN | 104302456 A | 1/2015 |
| CN | 105209233 | 12/2015 |
| CN | 205021904 | 2/2016 |
| CN | 105520278 | 4/2016 |
| CN | 205291380 U | 6/2016 |
| CN | 108472843 A | 8/2018 |
| CN | 109318487 A | 2/2019 |
| CN | 110831733 A | 2/2020 |
| DE | 1704502 A1 | 5/1971 |
| DE | 1729011 | 6/1971 |
| DE | 3032246 | 4/1982 |
| DE | 3229762 A1 | 2/1983 |
| DE | 3437786 | 4/1986 |
| DE | 29520911 U1 | 6/1996 |
| DE | 19633467 | 2/1998 |
| DE | 19648804 | 5/1998 |
| DE | 19654860 | 5/1998 |
| DE | 19704700 | 9/1998 |
| DE | 19860611 | 3/2000 |
| DE | 10117979 A1 | 8/2002 |
| DE | 202004003679 U1 | 5/2004 |
| DE | 102004049060 | 6/2005 |
| DE | 102004028462 | 12/2005 |
| DE | 202006009569 | 8/2006 |
| DE | 202007006164 | 9/2007 |
| DE | 102006024940 A1 | 12/2007 |
| DE | 102007054723 | 5/2009 |
| DE | 102009030678 | 4/2010 |
| DE | 102009004386 | 7/2010 |
| DE | 202011109598 | 2/2012 |
| DE | 102011108744 | 1/2013 |
| DE | 102012206094 | 10/2013 |
| DE | 102013012515 | 3/2014 |
| DE | 102013002519 | 8/2014 |
| DE | 102013108053 | 1/2015 |
| DE | 102013221018 | 4/2015 |
| DE | 102013221020 | 4/2015 |
| DE | 102014107847 | 12/2015 |
| DE | 102014216992 A1 | 3/2016 |
| DE | 102015202013 | 8/2016 |
| DE | 102015202014 | 8/2016 |
| DE | 102015224885 | 6/2017 |
| DE | 102020110352 A1 | 10/2020 |
| EP | 0455835 A1 | 11/1991 |
| EP | 0578272 A1 | 1/1994 |
| EP | 0790010 | 8/1997 |
| EP | 0792593 | 9/1997 |
| EP | 0976518 | 2/2000 |
| EP | 1016354 | 7/2000 |
| EP | 1259365 | 11/2002 |
| EP | 1535714 | 6/2005 |
| EP | 1990170 | 11/2008 |
| EP | 2564719 | 3/2013 |
| EP | 2649896 A2 | 10/2013 |
| EP | 2684665 | 1/2014 |
| EP | 2764972 | 8/2014 |
| EP | 2767181 | 8/2014 |
| EP | 2786670 | 10/2014 |
| EP | 2845504 | 3/2015 |
| EP | 2862467 | 4/2015 |
| EP | 2865289 | 4/2015 |
| EP | 2984956 | 2/2016 |
| EP | 3053732 A1 | 8/2016 |
| EP | 2649896 | 10/2016 |
| EP | 3114954 A1 | 1/2017 |
| EP | 2767183 | 4/2017 |
| EP | 3488723 A1 | 5/2019 |
| FR | 1484844 A | 6/1967 |
| GB | 1063353 | 3/1967 |
| GB | 1248314 A | 9/1971 |
| GB | 1275095 | 5/1972 |
| GB | 1417522 A | 12/1975 |
| GB | 1439101 | 6/1976 |
| JP | S48-045560 | 6/1973 |
| JP | S48-042216 | 12/1973 |
| JP | S49-020266 | 5/1974 |
| JP | 54114354 | 9/1979 |
| JP | 55129004 | 10/1980 |
| JP | 5620402 | 2/1981 |

(56) References Cited

FOREIGN PATENT DOCUMENTS

| | | |
|---|---|---|
| JP | 57005009 | 1/1982 |
| JP | 57180653 | 11/1982 |
| JP | S58-142828 | 8/1983 |
| JP | S60-500491 | 4/1985 |
| JP | 6141402 | 2/1986 |
| JP | S63-74629 A | 4/1988 |
| JP | H03-502286 | 5/1991 |
| JP | H06-218830 A | 8/1994 |
| JP | H06-305039 A | 11/1994 |
| JP | H07-59368 B2 | 6/1995 |
| JP | H07-186151 A | 7/1995 |
| JP | H08-052761 A | 2/1996 |
| JP | 08131209 | 5/1996 |
| JP | 08239570 | 9/1996 |
| JP | 09322803 | 12/1997 |
| JP | H10-058475 A | 3/1998 |
| JP | H10138252 * | 5/1998 |
| JP | 11129275 | 5/1999 |
| JP | 11291275 | 10/1999 |
| JP | 2000037208 | 2/2000 |
| JP | 2000190394 | 7/2000 |
| JP | 2000279205 | 10/2000 |
| JP | 2002119302 | 4/2002 |
| JP | 2002144366 | 5/2002 |
| JP | 2003135105 | 5/2003 |
| JP | 2003310302 | 11/2003 |
| JP | 2006137032 | 6/2006 |
| JP | 2007504977 | 3/2007 |
| JP | 2008544009 | 12/2008 |
| JP | 2009518495 | 5/2009 |
| JP | 2012-504024 A | 2/2012 |
| JP | 2014158708 | 9/2014 |
| JP | 2014531352 | 11/2014 |
| KR | 20100032561 A | 3/2010 |
| KR | 20160037252 A | 4/2016 |
| WO | 9420568 | 9/1994 |
| WO | 9955186 | 11/1999 |
| WO | 2002/004188 A1 | 1/2002 |
| WO | 2005026243 | 3/2005 |
| WO | 2005/066250 A1 | 7/2005 |
| WO | 2007/082838 A1 | 7/2007 |
| WO | 2008/087078 A1 | 7/2008 |
| WO | 2009036240 | 3/2009 |
| WO | 2010/136398 A1 | 12/2010 |
| WO | 2011125540 | 10/2011 |
| WO | 2011134996 | 11/2011 |
| WO | 2014150122 | 9/2014 |
| WO | 2015052265 | 4/2015 |
| WO | 2015052267 | 4/2015 |
| WO | 2015075546 | 5/2015 |
| WO | 2016/023067 A1 | 2/2016 |
| WO | 2016/030026 A1 | 3/2016 |
| WO | 2016/030333 A1 | 3/2016 |

OTHER PUBLICATIONS

Dieter, George E. . . (1997). ASM Handbook, vol. 20—Materials Selection and Design. ASM International. Retrieved from https://app.knovel.com/hotlink/toc/id:kpASMHVMS2/asm-handbook-volume-20/asm-handbook-volume-20 (Year: 1997).*
Machine English translation of AT505333, Accessed Mar. 4, 2024 (Year: 2008).*
Office Action, Japanese Patent Application No. 2021-041311, Nov. 2, 2021, 8 pages.
"Colour and Additive Preparations for Extruded Polyolefin Foams", Gabriel-Chemie Group, Available online at: www.gabrielchemie.com/downloads/folder/PE%20foams_en.pdf, Jan. 17, 2017, 20 pages.
European Extended Search Report, European Patent Application No. 17204880.3, Aug. 6, 2018.
"Foaming", Available online at: http://www.dow.com/polyethylene/na/en/fab/foaming.htm, Dec. 7, 2011, 2 pages.
Office Action, Chinese Patent Application No. 201711247307.1, Aug. 20, 2019, 19 pages.
PCT International Search Report and Written Opinion, PCT Application No. PCT/EP2017/080420, Jun. 7, 2018, 12 pages.
"Plastic", Britannica Online Encyclopedia, Available online at: https://www.britannica.com/print/article/463684, Accessed from Internet on Aug. 17, 2016, 15 pages.
Office Action, German Patent Application No. 102016223980.5, Apr. 13, 2017, 7 pages.
NAUTA, "Stabilisation of Low Density, Closed Cell Polyethylene Foam", University of Twente, Netherlands, Jan. 2000, 148 pages.
Office Action, Japanese Patent Application No. 2017-231377, Feb. 19, 2019, 7 pages.
Partial Search Report, European Patent Application No. 17204880.3, May 4, 2018, 14 pages.
U.S. Appl. No. 29/592,935, filed Feb. 3, 2017, Unpublished.
U.S. Appl. No. 29/592,946, filed Feb. 3, 2017, Unpublished.
U.S. Appl. No. 29/595,857, filed Mar. 2, 2017, Unpublished.
U.S. Appl. No. 62/137,139, filed Mar. 23, 2015, Unpublished.
U.S. Appl. No. 29/663,342, filed Sep. 13, 2018, Unpublished.
U.S. Appl. No. 29/643,233, filed Apr. 5, 2018, Unpublished.
U.S. Appl. No. 29/641,371, filed Mar. 21, 2018, Unpublished.
U.S. Appl. No. 29/663,029, filed Sep. 11, 2018, Unpublished.
U.S. Appl. No. 29/641,256, filed Mar. 20, 2018, Unpublished.
U.S. Appl. No. 29/641,223, filed Mar. 20, 2018, Unpublished.
U.S. Appl. No. 29/664,097, filed Sep. 21, 2018, Unpublished.
U.S. Appl. No. 29/679,962, filed Feb. 12, 2019, Unpublished.
U.S. Appl. No. 29/691,166, filed May 14, 2019, Unpublished.
U.S. Appl. No. 29/691,854, filed May 20, 2019, Unpublished.
U.S. Appl. No. 29/693,455, filed Jun. 3, 2019, Unpublished.
U.S. Appl. No. 29/697,489, filed Jul. 9, 2019, Unpublished.
Office Action, Japanese Patent Application No. 2017-231377, Dec. 10, 2019, 10 pages.
U.S. Appl. No. 29/719,889, filed Jan. 8, 2020, Unpublished.
U.S. Appl. No. 29/721,029, filed Jan. 17, 2020, Unpublished.
Office Action, Chinese Application No. 201711247307.1, Jul. 30, 2020, 16 pages.
Office Action, Japanese Patent Application No. 2017-231377, Sep. 1, 2020, 4 pages.
U.S. Appl. No. 15/829,230, Final Office Action, Sep. 26, 2019, 15 pages.
U.S. Appl. No. 15/829,230, Non-Final Office Action, Dec. 20, 2019, 19 pages.
U.S. Appl. No. 15/829,230, Non-Final Office Action, Jun. 3, 2019, 22 pages.
U.S. Appl. No. 15/829,230, Notice of Allowance, Mar. 27, 2020, 9 pages.
U.S. Appl. No. 16/918,014, filed Jul. 1, 2020, Unpublished.
U.S. Appl. No. 16/918,905, filed Jul. 1, 2020, Unpublished.
U.S. Appl. No. 16/918,241, filed Jul. 1, 2020, Unpublished.
U.S. Appl. No. 17/004,430, filed Aug. 27, 2020, Unpublished.
U.S. Appl. No. 29/730,512, filed Apr. 6, 2020, Unpublished.
U.S. Appl. No. 29/706,274, filed Sep. 19, 2019, Unpublished.
Decision of Rejection, Chinese Patent Application No. 201711247307.1, Jul. 21, 2021, 17 pages.
U.S. Appl. No. 29/760,713, filed Dec. 3, 2020, Unpublished.
U.S. Appl. No. 29/762,463, filed Dec. 16, 2020, Unpublished.
U.S. Appl. No. 29/767,743, filed Jan. 25, 2021, Unpublished.
U.S. Appl. No. 29/773,594, filed Mar. 10, 2021, Unpublished.
U.S. Appl. No. 29/774,470, filed Mar. 17, 2021, Unpublished.
U.S. Appl. No. 29/777,634, filed Apr. 7, 2021, Unpublished.
U.S. Appl. No. 17/380,956, filed Jul. 20, 2021, Unpublished.
U.S. Appl. No. 29/800,246, filed Jul. 20, 2021, Unpublished.
U.S. Appl. No. 17/384,557, filed Jul. 23, 2021, Unpublished.
U.S. Appl. No. 17/397,446, filed Aug. 9, 2021, Unpublished.
U.S. Appl. No. 17/399,842, filed Aug. 11, 2021, Unpublished.
European Extended Search Report, European Patent Application No. 21209925.3, Jul. 18, 2022, 13 pages.
"New Concept of Green", Zhongguancun Promotion Center for International Environmental Protection Industry et al., Beijing, 2004, 8 pages.
Office Action, Japanese Patent Application No. 2022-052750, Jan. 31, 2023, 10 pages.
Office Action, German Patent Application No. 102016016023.3, Jul. 5, 2023, 8 pages.

(56) References Cited

OTHER PUBLICATIONS

Office Action, Chinese Patent Application No. 202210208363.9, Jun. 14, 2023, 16 pages.
Office Action, Chinese Patent Application No. 202210208358.8, Jun. 22, 2023, 12 pages.
Office Action, Chinese Patent Application No. 202210208363.9, Nov. 9, 2023, 12 pages.
Shiyanjun et al., "Research on the Progress of Modern Materials Science", 2019, 9 pages.
Office Action, Chinese Patent Application No. 202210208358.8, Nov. 23, 2023, 11 pages.
Decision of Rejection, Chinese Patent Application No. 202210208363.9, Mar. 16, 2024, 9 pages.
Office Action, Japanese Patent Application No. 2013-137684, Apr. 23, 2024, 8 pages.

\* cited by examiner

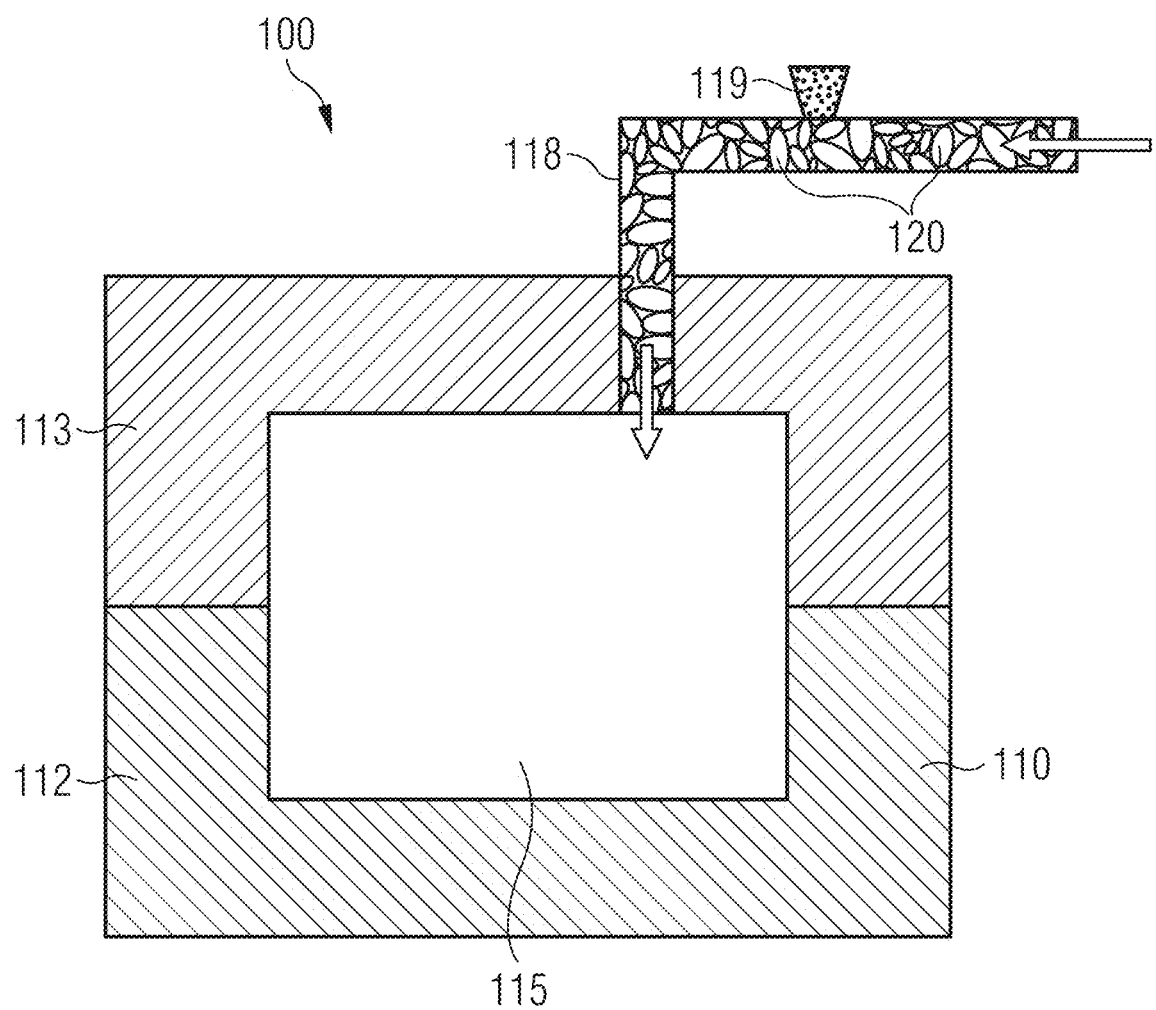

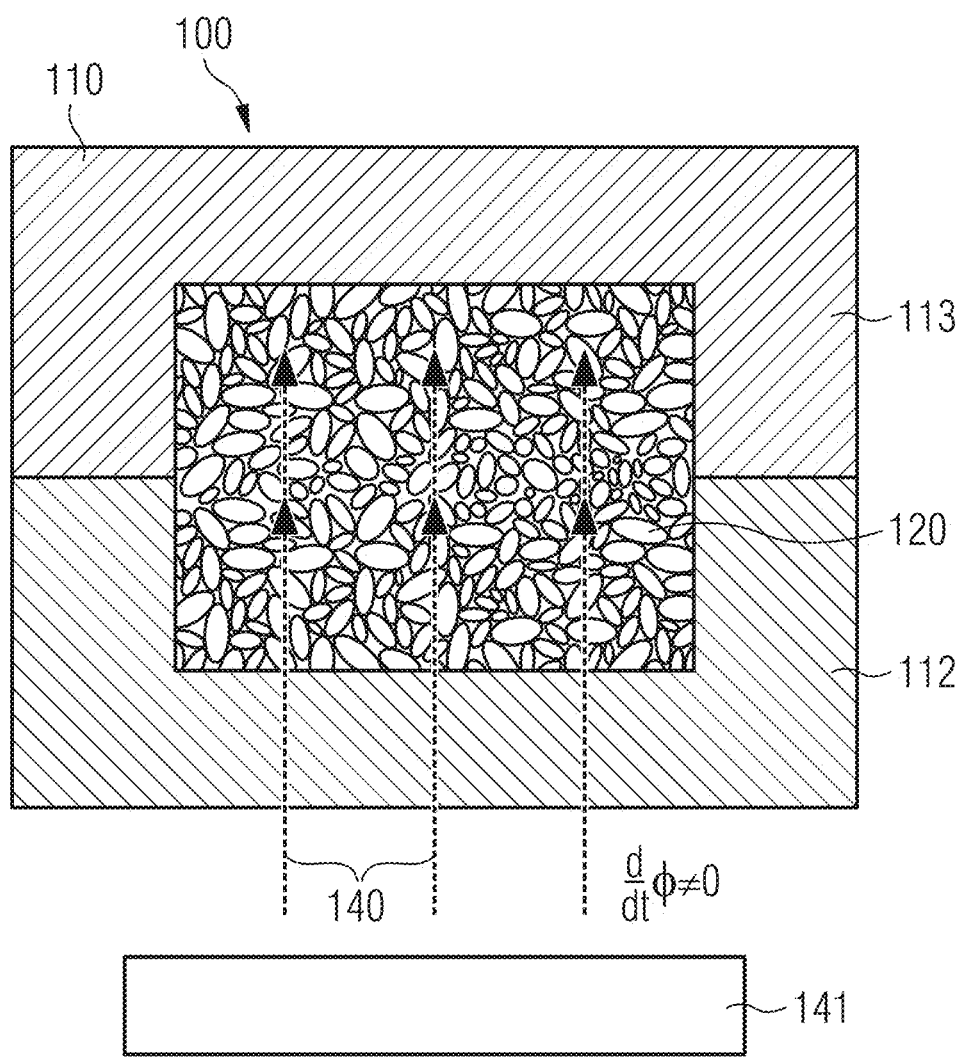

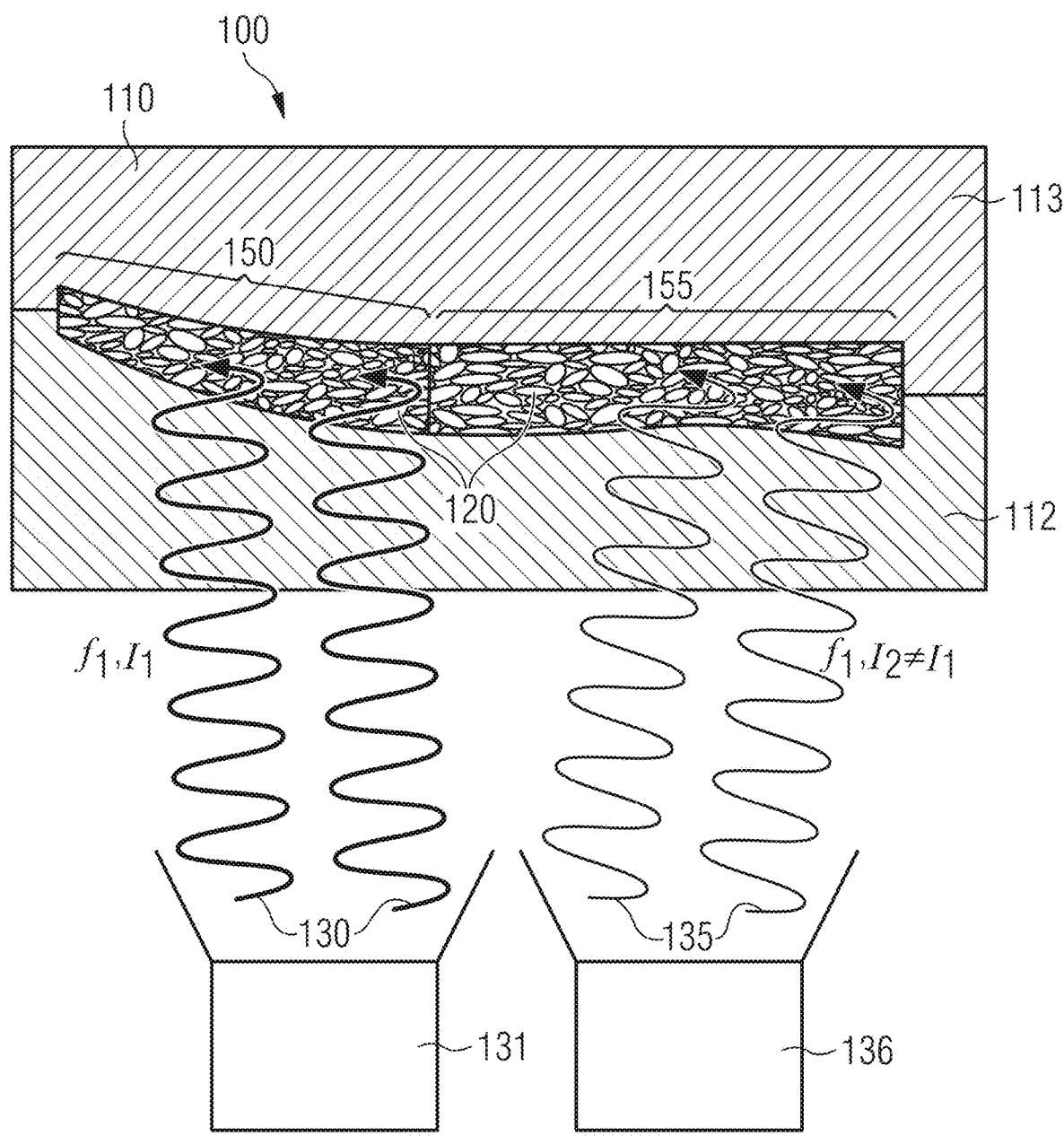

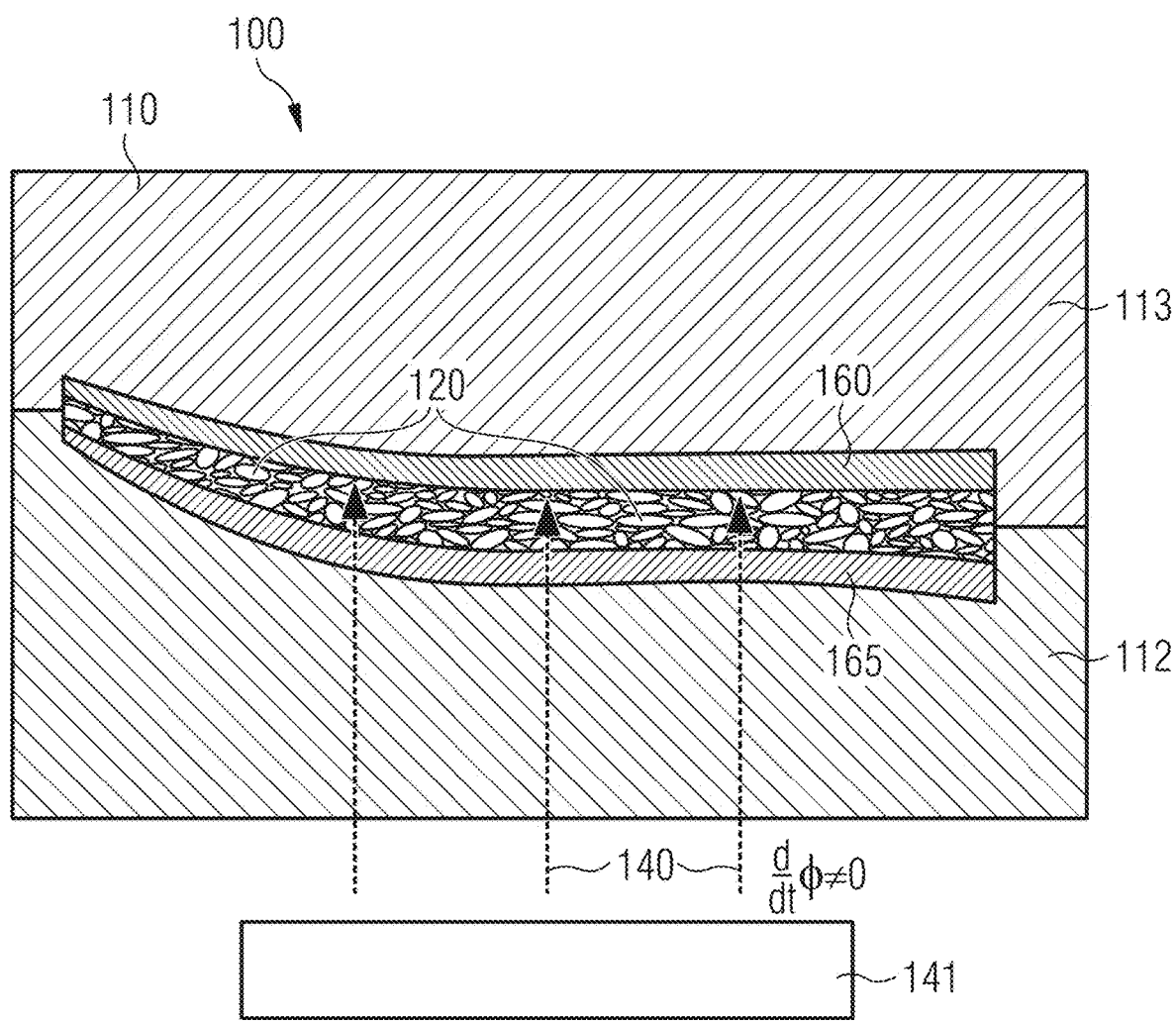

METHOD FOR THE MANUFACTURE OF A PLASTIC COMPONENT, PLASTIC COMPONENT, AND SHOE

CROSS REFERENCE TO RELATED APPLICATION

This application is a divisional of U.S. patent application Ser. No. 15/829,230, filed Dec. 1, 2017, entitled METHOD FOR THE MANUFACTURE OF A PLASTIC COMPONENT, PLASTIC COMPONENT, AND SHOE ("the '230 application", which is related to and claims priority benefits from German Patent Application No. DE 10 2016 223 980.5, filed on Dec. 1, 2016, entitled METHOD FOR THE MANUFACTURE OF A PLASTIC COMPONENT, PLASTIC COMPONENT, AND SHOE ("the '980.5 application"). The '230, and '980.5 applications are hereby incorporated herein in their entirety by this reference.

FIELD OF THE INVENTION

The present invention relates to a method for the manufacture of a plastic component, in particular a cushioning element for sports apparel, a plastic component manufactured with such a method, for example a sole or part of a sole for a shoe, as well as a shoe with such a sole.

BACKGROUND

Nowadays, plastic components play an essential role in many areas of technology and everyday life. As examples, the aviation and aerospace industry as well as the automotive industry are mentioned. In these areas, plastic components may, for example, serve as impact protection elements, e.g. bumpers, or they may be used for the manufacture of panel-elements, seat shells, arm rests, and so forth. Plastic components may also be used in the packing industry, for example, for packing up sensitive and easily damaged goods for delivery.

In all of these exemplary areas of application, it is desirable that the plastic components comprise as small a weight as possible, being, however, at the same time sufficiently resilient. In particular, with regard to plastic components being used for impact protection or for safely wrapping up goods, plastic components should also comprise good cushioning and absorption properties with regard to blows or hits. In this context, foamed plastic materials are known, like for example expanded polystyrene—e.g. available from BASF under the trade names of Styropor® or Styrodur®.

The use of expanded plastic materials has also found its way into the manufacture of cushioning elements for sports apparel, for example for the manufacture of shoe soles for sports shoes. In particular, the use of particles of expanded thermoplastic polyurethane (eTPU), which are fused together by supplying heat in the form of steam or connected by the use of a binder material as described in DE 10 2012 206 094 A1 and DE 10 2011 108 744 B1, was considered. The use of particles from eTPU has turned out to be beneficial in order to provide shoe soles or parts of soles with a low weight, good temperature stability and small hysteresis-losses with regard to the energy exerted for the deformation of the sole during running.

In addition, DE 10 2013 002 519 A1 discloses extended possibilities for the manufacture of cushioning elements for sports apparel from such particles, for example by loading a mold with the particles via a stream of liquid or steam.

Common to the methods known is, however, that the processing of the base material to dimensionally stable components of a high quality is often only possible up to a certain thickness or a certain packing density, meaning that the possible shapes of components that may be manufactured may be limited. This is due to the fact that the known manufacturing methods necessitate supplying the binder material or heat energy also to the interior of the components. For a liquid binder material or heat energy supplied by steam, this is only possible to a limited degree for thicker components and/or may lead to imperfections, because "channels" or "inlet openings" are provided in the component to allow the binder or the steam to homogeneously infuse the base material within the mold. Moreover, in particular when using steam as an energy carrier, it turns out to be undesirable that a major share of the energy stored within the steam may be lost in the mold instead of being supplied to the particles/particle surfaces. This may, on the one hand, necessitate a long pre-heating phase until the mold is heated up to a saturation temperature, and may, on the other hand, delay stabilization and cooling of the fused component since the mold may have stored a large amount of heat energy that delays cooling. Therefore, the method may be protracted and very energy inefficient.

It is therefore an objective underlying the present invention to provide improved methods for the manufacture of plastic components, in particular of cushioning elements for sports apparel, which allow the manufacture of complexly shaped plastic components with potentially greater thickness and packing densities, without significantly compromising the quality of the finished components. Furthermore, the manufacturing effort shall be kept low and the manufacturing and cooling duration short, and the method shall further be as energy efficient as possible while making do without poisonous or environmentally hazardous substances.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for manufacturing a plastic component, in particular a cushioning element for sports apparel, comprising: loading a mold with a first material, which comprises a particles of an expanded material; and while loading the mold, pre-heating the particles by supplying energy, wherein the energy is supplied in a form of at least one electromagnetic field.

In certain embodiments, the loading step comprises transporting the particles from a container to the mold via at least one feed line.

In some embodiments, the particles are pre-heated while in at least one of the container and the at least one feed line.

The particles, in certain embodiments, are pre-heated in the mold prior to closing the mold.

The energy, in some embodiments, supplied by the at least one electromagnetic field is varied over time.

In certain embodiments, the energy supplied by the at least one electromagnetic field is gradually increased over time.

In some embodiments, the method further comprising a step of fusing surfaces of the particles by supplying energy in a form of at least one electromagnetic field.

The form of the at least one electromagnetic field used for pre-heating the particles, in certain embodiments, is different than the form of the at least one electromagnetic field used for fusing the surfaces of the particles.

The particles, in some embodiments, comprise at least one of: expanded thermoplastic polyurethane, eTPU; expanded polyamide, ePA; expanded polyetherblockamide, ePEBA; polylactide, PLA; polyether-block-amide, PEBA; polyethylene terephthalate, PET; polybutylene terephthalate, PBT; and thermoplastic polyester ether elastomer, TPEE.

In certain embodiments, the particles further comprise an energy absorbing material, which absorbs the energy supplied by the at least one electromagnetic field such that the energy absorbing material contributes to the step of fusing the surfaces of the particles.

In some embodiments, the particles are mixed with the energy absorbing material prior to the loading step.

The energy absorbing material, in certain embodiments, comprises at least one of water and a metal.

The energy, in some embodiments, is supplied in a form of radiation in a microwave range, 300 MHz-300 GHz.

In certain embodiments, the energy is supplied by electromagnetic induction.

In some embodiments, more energy is supplied to the particles in a first partial region of the mold than in a second partial region of the mold.

The energy, in certain embodiments, is supplied to the particles in a first partial region of the mold with an electromagnetic field with a first frequency and in a second partial region of the mold with an electromagnetic field with a second frequency, wherein the second frequency is different from the first frequency.

An average amount of the energy absorbing material per particle, in some embodiments, varies within the mold.

In certain embodiments, the mold is further loaded with a second material, which remains substantially unaltered by the at least one electromagnetic field.

In some embodiments, a ratio of an amount of energy absorbed by the first material to a total amount of energy absorbed by the first material and the mold lies in a range 1.0-0.2.

According to certain embodiments of the present invention, a method for manufacturing a cushioning element for sports apparel, comprising: opening a mold by a predetermined amount into a loading position, wherein the mold comprises at least two mold parts and the predetermined amount by which the mold is opened influences an available loading volume of the mold; loading a first material which comprises particles of an expanded material into the loading volume created by opening the mold; closing the mold into a closed position; and fusing surfaces of the particles by at least supplying energy in a form of at least one electromagnetic field.

In certain embodiments, in the loading position of the mold, the at least two mold parts are in different areas of the mold spaced apart at varying distances compared to the closed position of the mold, so that during the step of closing the mold, the at least two mold parts are moved together over different distances in the different areas.

In some embodiments, at least one of the at least two mold parts comprises several individual sub-parts, and wherein a distance between the at least two mold parts in the loading position of the mold may be individually controlled for each sub-part in order to obtain the varying distances in the different areas.

In certain embodiments, during the step of closing the mold, at least one of the at least two mold parts is pivoted around an eccentrically arranged swivel axis.

In some embodiments, during the step of closing the mold, the particles are differently compressed in the different areas of the mold.

The predetermined amount by which the mold is opened, in certain embodiments, influences mechanical properties of the cushioning element.

The cushioning element, In some embodiments, is a shoe sole or part of a shoe sole.

BRIEF DESCRIPTION OF THE DRAWINGS

In the following detailed description, embodiments of the invention are described referring to the following figures:

FIGS. 1a-i are diagrams illustrating an inventive manufacturing method according to certain embodiments of the present invention.

BRIEF DESCRIPTION

Figure 1B:
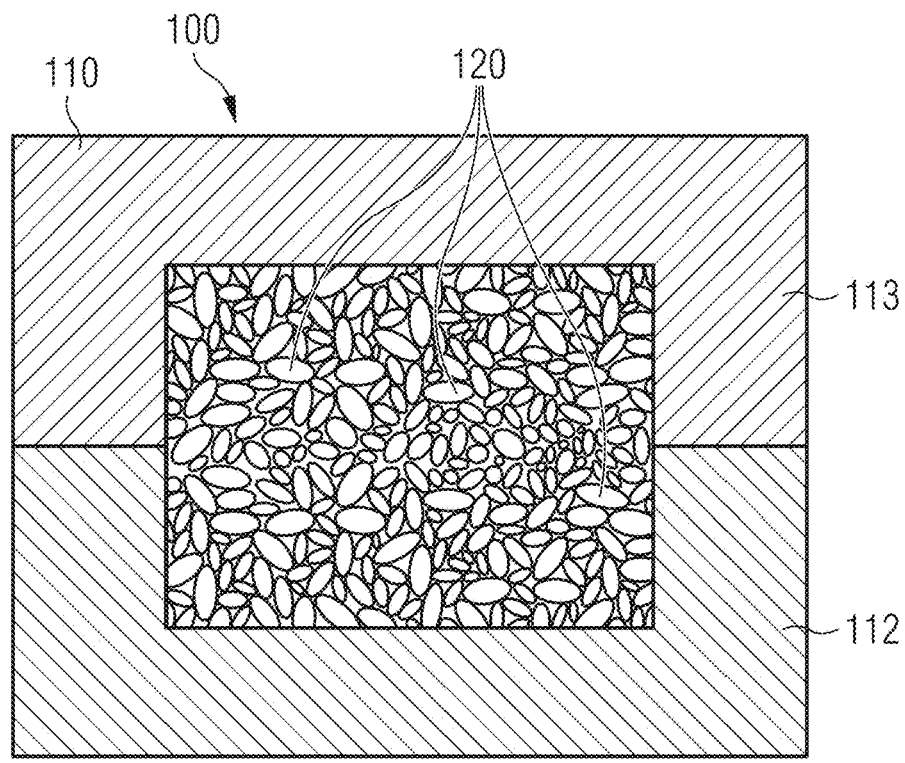

This objective is at least partially solved by aspects of the present invention.

According to an aspect of the present invention, a method for the manufacture of a plastic component, in particular a cushioning element for sports apparel, is provided which comprises loading a mold with a first material which comprises particles of an expanded material, and, during loading the mold, pre-heating the particles by supplying energy. The energy is supplied in the form of at least one electromagnetic field.

Particles of an expanded material will sometimes also be called "foam particles" in this document, and the manufactured plastic components will consequently sometimes be called "particle foam components". Other terms by which such particles of an expanded material may be referred to include "beads" or "pellets", for example.

By pre-heating the particles already during the loading of the mold, the amount of energy that must be supplied to the particles within the mold may be reduced. This may help reduce the molding time, save energy, for example, by avoiding excessive energy absorption by the mold, and also facilitate cooling and stabilization of the molded component. These effects may further be promoted by the fact that the energy is provided by at least one electromagnetic field, i.e. the energy provision is not coupled to any kind of material transport, like injection of energetic steam, for example. Pre-heating the particles already during loading of the mold can also contribute to allowing a more fine-tuned control of the manufacturing method in general, as different subsets of the particles used for the manufacture of a given component may be pre-heated to different degrees, for example.

The loading may comprise the transport of the particles from a container to the mold via at least one feed line.

This can facilitate automatization of the manufacturing method, for example, in an automated production line.

The particles may be pre-heated while in the container and/or in the feed line.

Pre-heating the particles in the container may be beneficial since it may only require little effort. On the other hand, pre-heating the particles in the feed line may be beneficial, for example, compared to pre-heating the particles in the container, as it might help avoid that the pre-heating has already subsided by the time the particles reach the mold. In some embodiments, a combination of both options is used. For example, in the container the particles may be provided with a certain amount of "basic" pre-heating, while in the feed line a precise desired amount of pre-heating may be imparted to the particles.

The particles may also be pre-heated in the mold prior to closing the mold.

Pre-heating the particles directly in the mold, prior to closing the mold, may be desirable, for example, if very precise control of the amount of pre-heating is desirable, since the time between imparting the pre-heating and the actual molding of the component may be minimized.

In some embodiments, the energy supplied by the at least one electro-magnetic field is varied over time.

The energy supplied by the at least one electromagnetic field may be gradually increased over time.

Benefits of these options will be discussed in the detailed description farther below.

The method may further comprise the step of fusing the surfaces of the particles by supplying energy, wherein the energy may again be supplied in the form of at least one electromagnetic field.

The type/nature of the electromagnetic field used for the pre-heating may be different to the type/nature of the electromagnetic field used for fusing the surfaces of the particles.

However, in some embodiments, the type/nature of the electromagnetic field used for the pre-heating is the same as the type/nature of the electromagnetic field used for fusing the surfaces of the particles.

This may simplify the constructional setup used for the manufacture, for example, due to only one source of electromagnetic field being necessary.

The use of at least one electromagnetic fields for supplying energy to the particles for fusing the surfaces of the particles may allow the manufacture of plastic components with various thicknesses and complex geometry, too, since supplying the energy is not coupled to any kind of material transport, as for example the introduction of a binder or steam. The at least one electromagnetic field may be chosen such that it permeates the mold loaded with the particles essentially homogeneously and supplies an essentially constant amount of energy to all particles, such that a homogeneous and constant fusing of the particle surfaces is achieved throughout the entire plastic component and in every depth of the component. Or, the at least one electromagnetic field is chosen such that the supply of energy to the particles arranged within the mold changes locally, as described in more detail in the following. In this way, the nature and degree of the fusing of the particle surfaces may be influenced locally. In particular, the fusing of the particle surfaces within the interior of the plastic component may be controlled independently of the fusing of the particle surfaces at the surface of the plastic component.

In conjunction with the pre-heating of the particles as described herein, a very detailed control of the manufacturing method may be possible, such that the properties and characteristics of the manufactured components may be adjusted and tuned very precisely.

In the following, some exemplary ways of controlling the manufacturing process are provided and it is described how different manufacturing parameters may have an influence on the properties of the manufactured components and/or the manufacturing method itself, for example its duration or energy consumption. As the skilled person will understand, these options may also be combined with one another.

For example, the density of the particles in the molding cavity can influence the energy absorption of the particles and, thus, the energy absorption of the part. Increasing the density of the particles can lead to improved heating. The improved heating is due to air having a low dielectric loss factor. Therefore, minimizing the air involved in the fusing process increases the absorption of the energy provided by the electromagnetic field, thus, improving the fusion of the particles.

For the same reasons, a mold with a higher compression ratio of the particles or a larger crack gap will also result in better energy absorption due to the increased packing density of the particles. It is pointed out that this is particularly beneficial over the known steam chest molding where it is known that an increased packing density increases cycle time due to the increased difficulty of heating the particle surfaces.

It is explicitly mentioned at this point that for clarity reasons, every kind of energy supply is linguistically associated with its own electromagnetic field within this application. When talking about "at least one electromagnetic field", this can therefore mean that at least one energy source is present which supplies the energy for the pre-heating and/or fusing in the form of "its electromagnetic field". In some embodiments multiple energy sources are used or one energy source may emit radiation with different frequencies and so forth, such that in these cases multiple electromagnetic fields are (linguistically) made reference to. These fields superimpose at a given point in space to form the physical electromagnetic field at this point in space.

The particles may be randomly arranged. However, the particles or at least some of the particles may also be aligned to each other or be otherwise intentionally arranged within the mold.

The particles may, for example, comprise at least one of the following materials: expanded thermoplastic polyurethane (eTPU), expanded polyamide (ePA), expanded polyether-block-amide (ePEBA), polylactide (PLA), polyether-block-amide (PEBA), polyethylene terephthalate (PET), polybutylene terephthalate (PBT) and thermoplastic polyester ether elastomer (TPEE).

Other possible polymers used for making the expanded particles may be selected from at least one of polyamides, polyester, polyetherketones, and polyolefins. The polyamide may be at least one of homopolyamide, copolyamide, polyetherblockamide, and polyphthalamide. The polyetherketone may be at least one of polyether ketone (PEK), polyether ether ketone (PEEK), and polyetherketoneketone (PEKK). The polyolefin may be at least one of polypropylene (PP), polyethylene (PE), olefin co-block polymer (OBC), polyolefine elastomer (POE), polyethylene co-vinyl acetate (EVA), polybutene (PB), and polyisobutylene (PIB). The expanded polymer material may include a suitable chain extender.

Moreover, the polymer may be selected from at least one of polyoxymethylene (POM), polyvinylidene chloride (PVCD), polyvinylalcohol (PVAL), polylactide (PLA), polytetrafluoroethylene (PTFE), polyvinylidene fluoride (PVDF), tetrafluoroethylene (FEP), ethylene-tetrafluoroethylene (ETFE), polyvinylfluoride (PVF), perfluoroalkoxy (PFA), and thermoplastic polyurethanes (TPU). In an example, the polymer comprises polybutylene terephthalate (PBT) and the chain extender comprises at least one selected from a polymeric material containing epoxy groups, pyromellitic dianhydride, styrene maleic anhydride, or combinations of at least one thereof, in particular a styrene-acrylate copolymer containing reactive epoxy groups.

Further, the polymer may comprise polyamide (PA) or polyether-block-amide (PEBA) and the chain extender may then comprise at least one selected from a polymeric material containing epoxy groups, pyromellitic dianhydride, styrene maleic anhydride, or combinations of at least one thereof, in particular a styrene-acrylate copolymer containing reactive epoxy groups. Also, the polymer may comprise thermoplastic polyester ether elastomer (TPEE) and the chain extender may then comprise at least one selected from a polymeric material containing epoxy groups, pyromellitic dianhydride, styrene maleic anhydride, or combinations of at least one thereof, in particular a styrene-acrylate copolymer containing reactive epoxy groups.

Generally, any polymer materials, e.g. semi-crystalline polymers, which absorb electromagnetic (RF) radiation to a sufficient degree, i.e. have a relatively high dielectric loss factor, may be used, such that no additional heat transfer medium is needed. Still, for some materials such as ePP (expandable polypropylene) or ePS (expandable polystyrene), an additional heat transfer medium may be necessary. Moreover, at least one additive may be incorporated into the polymer material to increase the dielectric loss factor.

Plastic components comprising particles from at least one of the materials mentioned above distinguish themselves by having very good cushioning properties and a good elasticity and energy return, and they may at the same time be very lightweight. Their properties may also be temperature independent to a large extent. It may therefore be beneficial to use mixtures (or regions) of different expanded particles in the mold, which may then be formed into a component using the methods described herein.

In other embodiments, the particles comprise an energy absorbing material which absorbs the energy supplied by the at least one electromagnetic field, such that the energy absorbing material contributes to the pre-heating of the particles and/or the fusing of the surfaces of the particles.

The energy absorbing material can serve the purpose of increasing the amount of energy absorbed by the particles from the electromagnetic fields per time unit. This may accelerate the manufacture of that plastic component and make it more energy efficient. An energy absorbing material may also be used to locally influence the amount of absorbed energy and hence the degree to which the particles are pre-heated and/or the particle surfaces are fused together, as discussed in further detail below.

In the case where it is only dispensed on the surfaces of the particles, the use of an energy absorbing material can further have the benefit that the particles are pre-heated and/or fused together only at their surfaces, while the electromagnetic field permeates the interior of the particles without noticeably depositing energy there, such that the cell structure and hence the elastic properties of the particles may remain essentially unaltered in their interior.

"Essentially unaltered" in this respect may, for example, mean that there are no noticeable differences in the physical properties relevant for the intended use of the component before and after supplying the energy.

The particles may be provided with the energy absorbing material prior to the loading of the mold.

Prior to being loaded into the mold, the particles may, for example, be stored in the energy absorbing material in a storage container and/or be intermixed, coated, soaked or impregnated with the energy absorbing material, and so forth. The energy absorbing material may be added to the particles in a feed line which is used for loading the mold with the particles. This may allow a dosed addition of the energy absorbing material such that the amount of energy absorbing material per particle may be adjusted and varied during the loading of the mold.

The energy absorbing material may, for example, comprise water.

Water is particularly cheap, environmentally friendly and easily handled and it has the further benefit that it does not enter into an undesirable chemical reaction with the particles which may, for example, influence the surface or cell structure or the appearance of the particles in an unwanted manner.

In some embodiments, the energy absorbing material comprises a metal.

Metal, for example in the form of a metal powder, may be beneficial as it may absorb a particularly high amount of energy from the at least one electromagnetic field while at the same time being easily handled and dosed. A metal may, moreover, also serve the purpose of influencing the appearance of the plastic component, if desirable, for example to provide the plastic component with a metallic shininess.

The energy may, for example, be supplied in the form of radiation in the microwave range, i.e. with a frequency in the range from 300 MHz-300 GHz.

Microwave generators are commercially available and may be implemented into a manufacturing device for performing an inventive method with comparatively little effort. In addition, in some embodiments, the microwave radiation is focused essentially onto the cavity of the mold in which the particles of the expanded material are loaded or onto a feed line or storage container by a suitable device, such that the energy efficiency of the method is increased. Furthermore, the intensity and frequency of the microwave radiation may be easily changed and adapted to the respective requirements.

The energy may also be supplied in the form of radiation in the radiofrequency range, i.e. with a frequency in the range from 30 kHz-300 MHz.

Radiofrequency generators are also commercially available and may be easily implemented in a manufacturing device. Moreover, radiofrequency radiation may be focused on the respective parts of the manufacturing device, and its intensity and frequency may be adapted to the requirements.

In other embodiments, the energy is supplied in the form of radiation in a frequency range different from the frequency ranges mentioned above.

As a specific example, the energy may be supplied in the form of infrared (IR) radiation. The use of ultraviolet (UV) radiation may also be considered.

In some embodiments, the energy is supplied by electromagnetic induction.

Electromagnetic induction describes the creation of an electric field by a temporal variation of the magnetic flux.

Hence, also in the case of electromagnetic induction, energy is supplied in the form of a temporally varying electromagnetic field. Electromagnetic induction may in particular be used to pre-heat the particles and/or fuse the particle surfaces, if the particles or their surfaces comprise a material or are coated with a material which comprises a certain electric conductivity. Then, the electric field created by the electromagnetic induction can create currents in this material, which heat up the particles or particle surfaces. This may allow the selective and locally focused supply of energy. Hence, the degree of pre-heating of the particles and/or fusing of the particles at their surfaces may be influenced and controlled very precisely, also for particles arranged within the interior of the plastic component.

Whether the use of radiation in the microwave range, radiation in the radiofrequency range, or electromagnetic induction is more desirable may, for example, depend on the question from which material the mold is made. In some embodiments, one chooses the option in which the mold absorbs the smallest possible amount of energy from the used electromagnetic field(s). In other embodiments, combinations of the above mentioned options are used.

In any of the above cases, i.e., supplying energy via radiation or electromagnetic induction, the component essentially contains no additional water, compared with steam chest molding. This allows the manufactured components to be passed on to further processing steps straightaway. For example, the further manufacturing steps of assembly (e.g., of a sole or sports apparel in general) and/or attaching to an upper can directly follow the manufacture of the component (for example, the further manufacturing steps may involve infrared welding and/or RF fusing).

The process of manufacture as described herein is therefore desirable for manufacturing customized sports apparel such as shoes. In particular, the sports apparel may be manufactured in a store using a suitable method for manufacture as described herein. The process of customized manufacture of sports apparel is described in further detail in the European patent applications EP 2 862 467 A1 and EP 2 865 289 A1 of Applicant.

In other embodiments, more energy is supplied to the particles in a first partial region of the mold than to particles in a second partial region of the mold. This may apply both to the pre-heating of the particles within the mold prior to closing the mold as well as to the fusing of the particle surfaces.

In this way, different partial regions may be created within the plastic component, which differ in their respective thickness, stiffness, breathability, flexibility, elasticity, feel, appearance or with regard to other characteristics, wherein potentially the same base material may be used, which might facilitate the manufacture.

In this document, the amount of energy which is supplied to the particles, in some embodiments, designates the amount of energy that is actually absorbed by the particles from the electromagnetic field(s).

In some embodiments, energy is supplied to the particles in a first partial region of the mold with an electromagnetic field with a first frequency and in a second partial region of the mold with an electromagnetic field with a second frequency, wherein the second frequency differs from the first frequency.

Energy may, for example, be supplied to the particles in the first partial region of the mold with electromagnetic radiation with a higher frequency than in the second partial region of the mold. Herein, both kinds of radiation with their differing frequencies may, for example, originate from a single radiation source, or separate radiation sources may be used that each emit radiation with one of the two frequencies. In other embodiments, a generalization to multiple kinds of radiation with more than two different frequencies is used.

In some embodiments, the intensity of the radiation (or of the different kinds of radiation) varies locally in different regions of the mold and, in this way, the degree of the pre-heating and/or fusing of the particle surfaces may be influenced.

On the other hand, to enable consistent energy application to parts with varying component thickness, (in shoe manufacture of midsoles, varying component thickness is sometimes referred to as wall thickness), the tool thickness may be varied. For example, higher density material may heat quicker, and, therefore, the tool may be locally adjusted to absorb more energy to balance with the energy absorption of the lower density areas. This may be beneficial because it is easier to apply a constant electromagnetic field than to apply a varying electromagnetic field. Thus, by varying the density of the material, the properties of the component may be influenced in a simpler way than by applying varying electromagnetic fields (e.g., varying in frequency).

In other embodiments, the average amount of energy absorbing material per particle varies within the mold.

This provides an embodiment which is complementary to the above mentioned options of changing the properties of the electromagnetic field(s) to locally influence the amount of energy which is supplied to the particles (i.e. the amount of energy which is actually absorbed by the particles). In some embodiments, prior to loading the mold, a certain amount of particles is pre-mixed with different amounts of energy absorbing material and the different mixtures are then positioned in different partial regions of the mold according to the desired degree of pre-heating and/or fusing. Or, the energy absorbing material may be added to the particles in a dosed manner during the loading of the mold, for example in a feed line, such that the content of energy absorbing material of the particles loaded into the mold may be varied.

The mold may further be loaded with a second material which remains essentially unaltered by the at least one electromagnetic field.

This may, for example, be a material the electromagnetic field permeates without being absorbed by the material to a noticeable degree. In particular, the second material may be free from energy absorbing material. "Essentially unaltered" may mean that the second material does not melt or start melting or become softer or harder. Further explanations with regard to the meaning of the term "essentially unaltered" were already put forth above and these explanations also apply here.

The second material may, for example, also comprise particles of an expanded material, in particular particles of eTPU, ePA, ePEBA, PLA, PEBA, PET, PBT and/or TPEE. Other examples have been described above.

Hence, an inventive manufacturing method may allow manufacturing a plastic component from a single base material which comprises partial regions that are e.g. strongly fused and/or stiffer and/or impermeable to air, as well as partial regions comprising a loose assemblage of the particles such that the plastic component may comprise a lower stiffness but higher breathability in these regions, and so forth.

The manufacturing method may also involve a step of stabilizing the particle foam component after fusing. This may be done by keeping the component in the tool after fusing so that the component maintains the desired part shape. The greater the volume of material in the mold the more beneficial it is to stabilize the component. The stabilization step may also include, for example, cooling channels or cooling ribs, to permit control of the rate at which the component cools and, thus, is stabilized.

The manufacturing method may also involve the additional step of using a foil to form a skin on the particle foam. The foil may be fused with the external foam particles. In some examples, this may be TPU, but other materials that exhibit a high degree of polarity for bonding may be used, such as PVC, which is the most sensitive in terms of polarity.

The particles of the second material may be randomly arranged. Or, the particles or at least some of the particles of the second material may be aligned to each other or be otherwise intentionally arranged within the mold.

A ratio of the amount of energy absorbed by the first material to the total amount of energy absorbed by the first material and the mold may lie in the range 1.0-0.2, or it may lie in the range 1.0-0.5, or it may even lie in the range 1.0-0.8.

In case a second material (and potentially even further materials) is loaded into the mold, the above ranges may apply to the ratio of the amount of energy absorbed by the first material to the total amount of energy absorbed by all materials within the mold plus the energy absorbed by the mold.

As already mentioned numerous times, the inventive manufacturing method may allow selectively supplying energy to regions where it is needed for the pre-heating of the particles and/or the fusing of the particle surfaces. It may, in particular with regard to the fusing of the particle surfaces in the closed mold, be possible by a suitable choice of the materials used for the mold to have the mold absorb only an insignificant amount of energy from the electromagnetic field. For one thing, this makes the manufacturing method more energy efficient. It may also help to prevent the mold from heating up noticeably, which in turn may shorten the cooling process significantly. A pre-heating of the mold may also be avoided. The above mentioned ratios of the amount of energy which is absorbed by the first material with the particles to the total amount of energy which is absorbed by all materials in the mold plus the mold itself have turned out to be realistic.

However, a method for the manufacture of sporting goods may also involve a step of heating or pre-heating at least part of the walls of the mold. This may also contribute to the pre-heating of the particles themselves. In this way, the surface quality may be improved and a better packing of the particles up to the mold surface may be achieved. In some embodiments, this may be achieved by applying a material to the mold surfaces that has a higher dielectric loss than material of the mold surface and so absorbs some radiation and thus heats up, without melting the material. Another method of achieving this manufacturing step could also be using a tool (e.g., a laser sintered tool which allows for more complex channels and also channels closer to the mold surface) to allow heating of the mold through passing a fluid around/through the tool. The fluid should have a low dielectric loss factor. In general, heating above the melting temperature of the components would lead to the component walls being melted, which is not desirable. It should be noted that care should be taken when heating the mold to a temperature near to, at, or above the glass transition temperature of the materials as the dielectric absorption of materials changes drastically in polymers above this value, i.e. increased absorption would mean that heating would rapidly ramp up over this temperature. Therefore, in some cases, heating the mold to a temperature near to, at, or above the glass transition temperature of the material should be avoided.

It is also mentioned that a laser sintered tool with complex channels and/or channels close to the mold surface may also be beneficial in that the channels can allow rapid cooling of the tool by passing a cooling fluid through the channels. The tool may also comprise cooling ribs to facilitate cooling.

Any mold manufacturing method known in the art may be used to construct a mold for use in the methods described herein.

For example, a mold may comprise an epoxy resin, in whole or in part. Other mold materials can also be used in connection with the manufacturing method. For example, the manufacturing method may involve the step of providing a mold of PTFE, PE, PEEK, UHMWPE (Ultra-high-molecular-weight polyethylene), or other materials which are structurally stable during electromagnetic field application. Providing such structurally stable materials can improve the step of fusing the surfaces of particles.

The use of an epoxy resin may also facilitate the manufacture of molds with complex three-dimensional geometry. Furthermore, an epoxy resin may be electrically non-conductive, such that, for example, a heating up of the mold or parts of a mold may be avoided or decreased. A mold or part of a mold made from epoxy resin may be basically non-absorbing for electromagnetic radiation, too. However, as discussed above, in some situations an additional step of heating at least part of the mold may be beneficial.

A further aspect of the present invention is provided by a method for the manufacture of a cushioning element for sports apparel which comprises: (a) opening a mold by a predetermined amount into a loading position, wherein (b) the mold comprises at least two mold parts, and the amount by which the mold is opened in step (a) influences an available loading volume of the mold; (c) loading a first material which comprises particles of an expanded material into the loading volume created by opening the mold in step (a); (d) closing the mold into a closed position; and (e) fusing the surfaces of the particles by at least supplying energy in the form of at least one electromagnetic field.

The mold may comprise two parts, but it may also comprise more than two parts. Having more than two parts may, for example, facilitate loading of the mold or demolding of the finished component.

For example, in the case of a mold with two mold parts, the two mold parts may provide a gap or crack between them in the loading position of the mold. The loading position of the mold may therefore also be referred to as the "crack-gap position" of the mold (irrespective of the number of mold parts). Through this crack, the first material may be loaded into the loading volume created between the mold parts by opening the mold.

The available loading volume may be completely filled with the first material. In other embodiments, the available loading volume is not completely filled with the first material, either to be then filled up by further materials, or to simply be partially left void. The loading may be performed without additional pressure (e.g., under atmospheric pressure), or the first material may be loaded into the mold under pressure (e.g., above atmospheric pressure). The loading may be facilitated by the use of a stream of air or liquid, for example.

The loading of the mold through a gap or crack between individual mold parts may be referred to as "crack-gap loading". The present aspect of the invention may therefore also be referred to as the "crack-gap method."

As mentioned, the predetermined amount by which the mold is opened in the loading position in step (a), and hence the crack height, influences the available loading volume into which the first material (and potentially further materials) may be loaded in step (c). A further factor that influences the available loading volume is, of course, the general size of the mold, i.e. the size of the component that is manufactured (e.g., a shoe size if the method is used to manufacture a shoe sole or part of a shoe sole). The available loading volume, in turn, can have an influence on the amount of compression the first material and, in particular, the particles of the expanded material experience upon closing of the mold during step (d) (assuming, for example, that the available loading volume is completely filled with the first material and that the closed position of the mold is always the same; otherwise, the filling height and specific configuration of the closed position may also influence the amount of compression).

The energy for fusing the surfaces of the particles may be supplied in the form of at least one electromagnetic field. However, other forms of supplying energy, for example using (pressurized) steam, may also contribute to the fusion of the surfaces of the particles. It is mentioned that the details and features of electromagnetic fields used to supply energy described throughout this specification may also apply to the present aspect of the invention, even if these details and features are described in the context of a different aspect. They are therefore not repeated here for conciseness.

In the loading- (or crack-gap-) position of the mold, the mold parts may, in different areas of the mold, be spaced apart at varying distances compared to the closed position of the mold, such that during step (d) of closing the mold the mold parts are moved together over different distances in the different areas.

At least one of the mold parts may, for example, comprise several individual sub-parts, and the distance between the mold parts in the loading position of the mold may be individually controlled for each sub-part, in order to obtain the varying distances between the mold parts in the different areas of the mold.

In other embodiments, during step (d) of closing of the mold, at least one of the mold parts is pivoted around an eccentrically arranged swivel axis.

During step (d) of closing the mold, the particles may be differently compressed in different areas of the mold. For example, a mold part with individual sub-parts, or a mold part being pivoted around an eccentrically arranged swivel axis may, upon closing of the mold, lead to different degrees of compression in different areas of the mold.

The predetermined amount by which the mold is opened in step (a) may influence the mechanical properties of the cushioning element. Such mechanical properties may, for example, include the stiffness, density and/or elasticity of the cushioning element. For example, a larger crack height may lead to a larger available loading volume, to more material being loaded into the mold, and hence to a stronger compression of the loaded material upon closing of the mold. This may lead to a higher density and higher stiffness of the manufactured cushioning element, for example.

Other factors that might influence the mechanical properties include, for example, the material composition of the first material being loaded into the mold, the loading pressure (e.g., atmospheric or above), the amount and kind of energy supplied for fusion of the particle surface, the duration of fusion, and so forth.

The cushioning element manufactured in this way may, for example, be a shoe sole or part of a shoe sole, for example a midsole.

Further details, options and benefits of this "crack-gap method" will be mentioned in the detailed description further below.

It is also emphasized that the "crack-gap method" for the manufacture of a cushioning element may be combined with the other aspects of the present invention described above and further below, but the different aspects of the present invention may also be practiced individually.

A further aspect of the present invention is provided by a plastic component, in particular a cushioning element for sports apparel (e.g., a shoe sole or part of a shoe sole), manufactured with embodiments of the inventive method.

A further aspect of the invention relates to a shoe, in particular a sports shoe, with such a cushioning element. The shoe may be a running shoe.

By use of the inventive manufacturing method for the manufacture of such a plastic component, the properties of the manufactured plastic component may be selectively and locally influenced without necessitating a complicated set up of the manufacturing device. Moreover, the manufacture may be energy efficient and environmentally friendly and may be completed in comparatively little time. Hence, the inventive manufacturing method may be suitable for use in mass production, for example the manufacture of shoes with soles or parts of soles manufactured by use of the inventive method. Moreover, the method may be automated to a large degree and different kinds of plastic components may be manufactured with a single manufacturing device, for example by adapting the frequency, intensity, duration of radiation, focusing, and other properties of the electromagnetic field(s) to the respective requirements for each plastic component.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Some embodiments of an inventive method are described in the following detailed description primarily with respect to cushioning elements for sports apparel, in particular soles for shoes. It is, however, emphasized that the present invention is not limited to these embodiments. To the contrary, it may also be used for plastic components for the automotive industry, for example for the manufacture of bumpers, fenders, panel-elements, seat shells or arm rests, for plastic components for the aviation and aerospace industry, for plastic components for the packing industry, for plastic components for sports equipment, and so forth.

Reference is further made to the fact that in the following only embodiments of the invention may be described in more detail. The skilled person will understand, however, that the optional method steps and modifications described with reference to these specific embodiments may also be modified or combined with one another in a different manner within the scope of the invention, and that individual steps or optional features of the method may also be omitted, if these seem dispensable. In order to avoid redundancies, reference is therefore made to the explanations in the preceding sections, which also apply to the following detailed description.

FIGS. 1a-i illustrate embodiments of an inventive method 100 for the manufacture of a plastic component. These are schematic representations, such that the proportions shown in FIGS. 1a-i need not necessarily match the actual proportions in a real-life application of the method 100. Rather, FIGS. 1a-i serve the purpose of indicating to the skilled person the scope of the present invention including potential design options and modifications of the method 100, as well as the different option to adapt the method 100 according to a given set of requirements.

The method 100 comprises the step of loading a mold 110 with a first material comprising particles 120 of an expanded material, also called "foam particles" herein, as shown in FIG. 1a.

During loading of the mold 110, the method 100 may also comprise the step of pre-heating the particles 120 by supplying energy, wherein the energy is supplied in the form of at least one electromagnetic field 130, 135, 140 (for more details on these fields, see below).

Options and features pertaining to the pre-heating step have already been discussed in detail above and are therefore not all repeated here, for conciseness. Some further details and benefits will be described farther below. It is also mentioned that, whenever the energy-absorbing characteristics of the particles 120 are discussed in the context of the fusion of the particle surfaces in the following, the same considerations may also apply to the pre-heating of the particles 120, where physically possible.

Importantly, however, it is emphasized that the manufacture of a component as described in the following may, in principle, also be performed without the pre-heating step. That is, the features and details described in the following with regard to the mold 110 or the fusion of the particle surface, for example, are to be regarded as independent aspects that may be practiced without pre-heating the particles 120, although certain synergetic benefits (e.g., reduced cycle times, to name only one) may be achieved by combining these aspects with a pre-heating of the particles 120.

The mold 110 may, for example, comprise two or more mold parts 112, 113 which may be movable relative to one another. The mold 110 encompasses a cavity 115 having a shape corresponding to the plastic component that is to be manufactured.

The mold 110 or the mold parts 112, 113 may, for example, comprise an epoxy resin. The use of epoxy resin for the manufacture of the mold 110 or the mold parts 112, 113 may allow providing molds 110 comprising a cavity 115 with a very complex three-dimensional geometry. Hence, complexly shaped plastic components may be manufactured with the inventive manufacturing method 100. However, other mold materials can also be used in connection with the method 100. For example, the method 100 may involve the step of providing a mold 110 of PTFE, PE, PEEK, or other materials which are structurally stable during electromagnetic field application.

The surface material of the mold 110 or the mold parts 112, 113 may be selected so that it has a similar loss factor to that of the foam particles 120 (i.e. the particles 120 of expanded material). One example of such suitable material is epoxy resin. Providing the surface of the mold 110 or mold parts 112, 113 with a material with a loss factor similar to that of the particles 120 can lead to a substantially uniform heating of both the particles 120 and the walls of the mold 110 enclosing the molding cavity 115, so that a better surface fusion of the component may be obtained. The surface of the mold 110 may, for example, be altered by a coating process or by applying a suitable surface material in another way known in the art.

Also, the mold parts 112, 113 may comprise capacitor plates (not shown). The capacitor plates may be arranged on an inner side of the mold parts 112, 113 (i.e. on the side of the parts 112, 113 facing the molding cavity 115). In another example, at least a portion of the mold parts 112, 113 may be made of capacitor plates.

More generally, the mold parts 112, 113 may be comprised of a layered construction. The mold part 112, 113 can, for example, each comprise a layered construction comprising a base plate, a molding plate defining at least part of the molding cavity 115, and an insulating layer on the inside of the molding plate (i.e. the side facing the cavity 115). Capacitor plates may also be included in such layered constructions.

The thickness of the molding plates and/or the capacitor plates may be varied. For example, by varying the thickness of the molding plates and/or the capacitor plates, the mold parts 112, 113 may be contoured. This allows fine tuning of the energy that is to be applied to the particles 120 in the mold 110. In some embodiments, adjusting the capacitor plates might allow the same molding plates to be kept, which may be more economical than adjusting the molding plates themselves.

Further, a voltmeter may be used for measuring the voltage of the capacitor. This may be helpful for determining the thermal output introduced into the particles 120 because the power is proportional to the square of the voltage.

At least one of the mold parts 112, 113 can also be formed of or comprise a composite material. The composite material may comprise a matrix material comprising a plastic material and bodies embedded therein, wherein the bodies comprise or are made of a material which has a better heat conductivity than the plastic material they are embedded in.

The embedded bodies may be particles or fibers, for example. The bodies may be completely embedded in the matrix material. If the bodies are particles, for example spherical particles, they may have a maximum size of 3 mm, of 2 mm or even of 1 mm. If they are fibers, they may have a maximum length of 20 mm, of 10 mm or even of 5 mm.

The matrix material may be made of a plastic material that is not electrically conductive, for example, an epoxy resin. The bodies may be dispersed within the matrix material such that at least most of them are not in contact with each other. In such a situation the bodies may be made of an electrically conductive material. As a specific example, the mold parts 112, 113 may both comprise capacitor plates as mentioned above and the mold parts may further comprise a composite material made of an electrically non-conductive plastic matrix material with electrically conductive fibers embedded therein in such a manner that at least most of them are not in electric connection with each other. In this case, the fibers can beneficially be arranged parallel to and adjacent to the capacitor plates.

For example, the embedded bodies may comprise or be made of mineral substances such as silica sand, a ceramic material, aluminum oxide, aluminum nitride, glass granules, frit, silicon carbide and/or magnesium oxide. The embedded bodies may also be glass fibers or carbon fibers.

Carbon fibers are generally electrically conductive, for which reason they are to be arranged parallel and adjacent to the capacitor plates of the mold parts 112, 113, if such capacitor plates are included.

Magnesium oxide has a high thermal capacity, such that the mold 110 with mold parts 112, 113 can rapidly absorb the heat introduced into the particles 120 during welding, and the resultant particle foam component cools down quickly.

Another option is that the composite material comprises materials which do not, or only to a limited degree, absorb RF radiation. Such a composite material does not influence/absorb the RF radiation, or only to a minimal extent. On account of the embedded bodies having a good thermal conductivity, however, the composite material can still rapidly dissipate heat present in the molding cavity 115, leading to a faster cool-down of the component after fusion.

A mold part 112, 113 comprising such a composite material may further be provided on its inside, i.e. on the side facing the molding cavity 115, with a coating which absorbs RF radiation more strongly than the composite material. Because of this, upon application of electromagnetic radiation in the area adjacent to the molding cavity 115 the mold part 112, 113 is heated, so that the foam particles 120 in the molding cavity 115 may be heated evenly. In particular, this coating can have similar electrical loss factor as the foam particles 120 to be welded in the mold 110. The coating may be a plastic coating, which may be made of or comprise PET (polyethylene terephthaltate) PEEK (polyether ketone), POM (polyoxymethylene), polyimide or PMMA (polymethyl methacylate).

An insulating layer can also be arranged on the inside of the mold 110 (i.e. facing towards the molding cavity 115). An insulating layer may help to avoid heating of the mold wall if the material of the insulating layer is chosen such that it does not get heated up by the electromagnetic radiation. In some examples, electrically insulating coatings may be made from a material which is essentially transparent to electromagnetic radiation, in particular RF radiation, said material being, for example, PTFE, PE, PEEK.

For example, the coating or insulating layer may be made from a material having a moderate loss factor, such as, e.g., PET (polyethylene terephthalate), PEEK (polyether ketone), POM (polyoxymethylene), polyimides and PMMA (polymethyl methacrylate). Polyoxymethylene has a dielectric loss factor D of approximately 0.008, and polymethyl methacrylate has a dielectric loss factor D of approximately 0.02 for RF radiation. These coatings are thus essentially transparent to RF radiation, since they absorb only a small part of the electromagnetic radiation and may, due to the relatively low loss factor, be formed with a certain thickness of, for example, at least 2 mm, in particular of at least 2.5 mm or at least 5 mm. In some embodiments, the coating is not thicker than 20 mm, in particular not thicker than 15 mm, and, in other embodiments, not thicker than 10 mm, so that the part of the energy of the electromagnetic radiation absorbed by the coating is small.

On the other hand, as already mentioned, the inside of the mold 110 may also be covered with a plastic material which, with the applied electromagnetic radiation, has a similar dielectric loss factor as the plastic material to be processed in the molding cavity 115 (e.g., the same loss factor as the material of the particles 120), so as to achieve a homogenous heating over the entire molding cavity 115 and in the edge portions thereof, when applying the electromagnetic radiation.

It is emphasized that the application of an insulating layer or of a plastic material with a similar loss factor as the particles 120 is available also for a mold 110 and mold parts 112, 113 which do not comprise a composite material as discussed above.

As another example, if it is deemed helpful to heat the mold surface enclosing the molding cavity 115, heating wires may be arranged adjacent to the surface of the mold enclosing the molding cavity 115. The heating wires are connected to a power source by which a heating current may be fed into the heating wires. Again, heating the walls/mold surface adjacent to the molding cavity 115 can help to achieve a better surface fusion of the particles 120, in particular of the particles abutting the walls of the mold 110.

The loading of the mold 110 with the first material comprising the particles 120 of the expanded material may, for example, proceed via a feed line 118 that is connected via an inlet with the cavity 115 of the mold 110. In some embodiments, the loading proceeds by a plurality of feed lines and inlets.

Alternatively, or in addition, the loading may also proceed by the movable mold parts 112, 113 of the mold 110 initially being moved apart from one another, such that at least one opening is created between the mold parts 112, 113 through which the loading proceeds (this option is not explicitly shown in the figures). After the loading of the mold 110 is completed, the movable mold parts 112, 113 may be moved together and/or the inlet(s) may be closed, such that the cavity 115 forms a closed molding chamber. The state wherein the mold parts 112, 113 are moved apart for loading with the first material with the particles 120 may be referred to as the loading state or "crack-gap state", and a mold that uses such loading may be referred to as a "crack-gap molding tool".

The amount by which the mold 110 is opened in the loading state may influence the available loading volume of the mold 110. The available loading volume may, in turn, influence the amount of material that is "worked into" the cushioning element, and hence the mechanical properties of the cushioning element like, for example, density, stiffness and/or elasticity.

Using a crack-gap during loading may, for example, help increase the density in a region of the particle foam component to be manufactured in which otherwise the density would turn out too low. For example, in such a region the mold may be opened to a larger amount and thus "overfilled" with particles, leading to a stronger compression of the particles upon closing of the mold and hence an increased density in the molded component.

More generally, the distance between the mold parts in the crack-gap position influences the available loading volume and hence the amount of particles that may be filled into the mold 110 in the loading state, and also the amount of compression the particles experience upon closing of the mold 110 (assuming, for example, the available loading volume is completely used and the mold 110 is always closed to the same final position; otherwise the filling height and the specific configuration of the closed position of the mold 110 may also influence the amount of compression). A larger distance between the mold parts 112 and 113 in the crack-gap position, i.e. a larger crack height, will allow more particles to be filled into the mold 110, which are therefore more strongly compressed when the mold 110 is closed, compared to a smaller crack height (again assuming, for example, that the available loading volume is completely used and the closed position of the mold is the same irrespective of the crack height; if this is not the case, the filling height and details of the closed position of the mold may also influence the compression, as already mentioned).

To summarize, the mold 110 may have two mold parts 112 and 113 (or more than two mold parts, but this is not discussed here explicitly, for conciseness) and in crack-gap molding the two mold parts 112, 113 are arranged in a crack-gap position in which they are spaced apart from one another a certain distance compared with the closed position for loading of the mold 110, and they are subsequently pressed together before fusion of the surfaces of the particles 120, thereby compressing the particles within the molding cavity 115. The distance between the mold parts 112 and 113 during loading, i.e. the amount the mold 110 is opened for loading, influences the available loading volume between the two mold parts 112 and 113, and it may hence influence or determine the amount of particles 120 that may be loaded into the mold 110. This, in turn, may influence or determine the amount of compression experienced by the particles 120 upon closing of the mold 110.

During filling of the mold 110, the mold parts 112 and 113 may be spaced apart at varying distances in different areas of the mold 110, so that during closing of the mold 110, the mold parts 112 and 113 are moved together over different distances in the different areas. For example, the mold parts 112 and 113 may comprise several individual sub-parts and the crack height between a sub-part on the first mold part 112 and a corresponding sub-part on the second mold part 113 may be individually controlled and varied for each sub-part. In some embodiments, only one of the two (or more) mold parts 112 or 113 comprises such individual sub-parts, while the other mold part(s) does not, which may allow for a simpler mold construction. With at least one mold part 112 or 113 comprising individually controllable sub-parts, the crack height and hence the loading of the mold 110 and compression of the first material with the particles 120 may still be locally controlled.

Hence, the first material and, in particular, the foam particles 120 may be compressed with differing strength in different areas of the mold 110. Thus, in some embodiments, different densities in the closed state of the mold 110 may be obtained. In other embodiments, variations in density due to different thicknesses in the molding cavity 115 may be levelled out or compensated for.

If, for example, soles for footwear are produced in the mold 110, then the resulting particle foam component is generally much thinner in the front section than in the rear. In cross-section, such a sole has a roughly wedge-shaped form. If one mold part 112 or 113 is, for example, pivoted around a swivel axis to create the crack-gap position, said axis being arranged transversely to the longitudinal axis of the mold 110 at the thinner end of the mold 110 (in other words arranged eccentrically) then on swiveling back into the closed position of the mold 110 a roughly constant density of the foam particles 120 contained therein is obtained. This option may, therefore, be beneficially applied for the manufacture of products which are wedge-shaped in cross-section. To repeat, during closing of the mold 110, the mold parts 112 and/or 113 may, for example, be pivoted around an eccentrically arranged swivel axis.

Moreover, individually controllable sub-parts for of the mold parts 112 and/or 113, or an eccentrically arranged swivel axis or axes, may also be used to compress areas of the molding cavity 115 with different thickness as evenly as possible, in order to obtain the most even heating and quality of fusion in the whole particle foam component. It may, however, also be expedient, if certain areas are to be heated more strongly, that greater compression take place in these areas so that, on account of their greater density, the foam particles 120 located therein absorb electromagnetic radiation more strongly. Consequently, during production of the particle foam components, in some embodiments, a predetermined, non-constant temperature profile is set.

It is mentioned that within the scope of the present invention, the aspects concerning the crack-gap loading of the mold 110 described just now may be practiced individually, without pre-heating of the particles 120, but also in combination with the further aspects and features of the present invention described above and below.

FIG. 1b shows the closed mold 110 loaded with the first material with the particles 120 of the expanded material. The at least one feed lines 118 and/or inlets may be connected to the mold 110 or mold parts 112, 113. For the processing, in some examples, at least one air channel may be added. In this way, in some embodiments, air may be injected for cooling and/or stabilization. Also, in some embodiments, excess gas may be diverted or the pressure reduced in the mold.

In some examples, the particles 120 may be swirled when they are loaded into the mold 110. This may be achieved by air streams or another gaseous stream. The air stream may be applied to the mold 110 by the feed lines 118 or in the inlets also used for loading the particles 120, or specific lines may be used for injecting air streams into the mold 110. Swirling may be desirable to separate the particles when loading them into the mold so as to avoid clustering thereof and to enable distribution thereof.

As mentioned above, prior to being loaded into the mold 110, the particles 120 may, for example, be stored in a storage container and/or be intermixed, coated, soaked or impregnated with the energy absorbing material, and so forth. As mentioned above, the energy absorbing material may be added to the particles 120 in a feed line 118 which is used for loading the mold 110 with the particles 120. This may allow a dosed addition of the energy absorbing material such that the amount of energy absorbing material per particle 120 may be adjusted and varied during the loading of the mold 110. The use of an energy absorbing material may be beneficial, for example, to permit a material to be able to absorb RF energy, i.e. to make it RF active (or active with regard to some other kind of electromagnetic radiation and/or induction. An energy absorbing material can also be used to reduce the necessary energy by pre-heating rather than RF fusing. Also, when trying to balance the RF absorption of multiple materials in one component, the use of an energy absorbing material might help. Its use may, for example, help to achieve operation within an ideal processing range, whereby one material has its processing window (or both) adjusted so that an optimum window may be found.

The loading of the particles 120 in some examples may be achieved by repeatedly opening and closing the material container. For example, opening and closing times may be on the order of 500 milliseconds to 1 second. In this way, the particles may be conveyed intermittently from the container to the feed line 118 and eventually to the mold 110. This may lead to breaking up a bridging of the foam particles 120 so that the particles 120 get at least partly isolated. This may be beneficial in the case of foam particles 120 having an adhesive surface, such as, e.g., eTPU foam particles 120.

Once there is a sufficient amount of particles 120 in the mold 110, the mold 110 is closed and/or the feed lines 118 and/or inlets are closed. In order to determine whether a sufficient amount of particles 120 has been loaded, the mold 110 can, for example, be filled by volume and when a feedback pressure is high enough it is assumed that the mold 110 is filled sufficiently. Or the mold 110 is filled based on weight.

In some examples, a variable pressure may be applied to the molding cavity 115. The addition of pressure to the molding cavity 115 can enhance the processing of the particles 120. For example, when applying pressure to the molding cavity 115 during loading, this also improves the ability to load the mold 110 as the particles 120 are made smaller, i.e. are under compression. Further, a negative pressure may be applied (i.e. a vacuum). This is beneficial if the foam particles 120 and/or the supplied compressed air have a certain moisture.

The particles 120 may be randomly arranged. However, the particles 120 or at least some of the particles 120 may also be aligned to each other or be otherwise intentionally arranged within the mold 110.

The particles 120 may, for example, comprise at least one of the following materials: expanded thermoplastic polyurethane (eTPU), for example eTPU which has a dielectric loss factor D of 0.2 at an electromagnetic radiation with a frequency of 1 MHz, expanded polyamide (ePA), and/or expanded polyether-block-amide (ePEBA). Other materials that may be used include PLA, PEBA, PET, PBT and TPEE. The first material may only comprise one kind of particles 120. In other embodiments, the first material with which the mold 110 is loaded comprises a mixture of different kinds of particles 120. For example, the particles 120 may differ in their material, shape, size, color, density, and/or combinations thereof, as well as their respective expanded material. For instance, depending on the purpose of the plastic component to be formed, the diameter of the particles 120 may, in some embodiments, be in the range of 3 mm to 5 mm.

In some embodiments, the particles 120 comprise an energy absorbing material that absorbs the energy supplied by the at least one electromagnetic field—as already mentioned and as further described below—and therefore contributes to the fusing (or the pre-heating) of the surfaces of the particles 120. This energy absorbing material may, for example, be added to the particles 120 prior to the loading of the mold 110. For example, the particles 120 may be provided with the energy absorbing material prior to loading of the mold 110 by storing them in the material or intermixing them with the material. In some embodiments, the energy absorbing material is added to the particles 120 during the loading of the mold 110, as shown in FIG. 1a, for example by a hopper 119 in the feed line 118.

In the simplest case, the particles 120 are provided with a constant amount of the energy absorbing material. That is, the amount of energy absorbing material is essentially the same for all particles 120. Herein, "essentially the same" may mean: as far as the method used for the addition of the energy absorbing material and the variation in the size of the particles 120 allows. Hence, in this case, there may be an essentially homogeneous distribution of the energy absorbing material within the first material with the particles 120.

In some embodiments, the added amount of energy absorbing material per particle 120 varies within the mold 110. This may, for example, be achieved in that, prior to the loading of the mold 110, mixtures of particles 120 and energy absorbing material are prepared which each comprise a different content of energy absorbing material, and with whom the mold 110 is subsequently loaded according to the desired distribution of the energy absorbing material within the mold 110. Or, the amount of energy absorbing material added through the hopper 119 is varied accordingly during the loading of the mold 110.

By a varying amount of energy absorbing material, the amount of energy supplied to the particles 120 by the electromagnetic field (the step of supplying energy in the form of at least one electromagnetic field will be further discussed below), i.e. the amount actually absorbed by the particles, may be locally influenced. For example, the amount of energy absorbed by the particles from the electromagnetic field may be proportional to the amount of energy absorbing material a given particle 120 comprises. The amount of energy a particle 120 absorbs may in turn have an influence on how strongly the surface of the particle 120 is fused with the surfaces of its neighboring particles. For example, the surface of the particle 120 is fused together with the surfaces of the neighboring particles the stronger, the more energy is supplied to and absorbed by the particle 120.

Figure 1C:
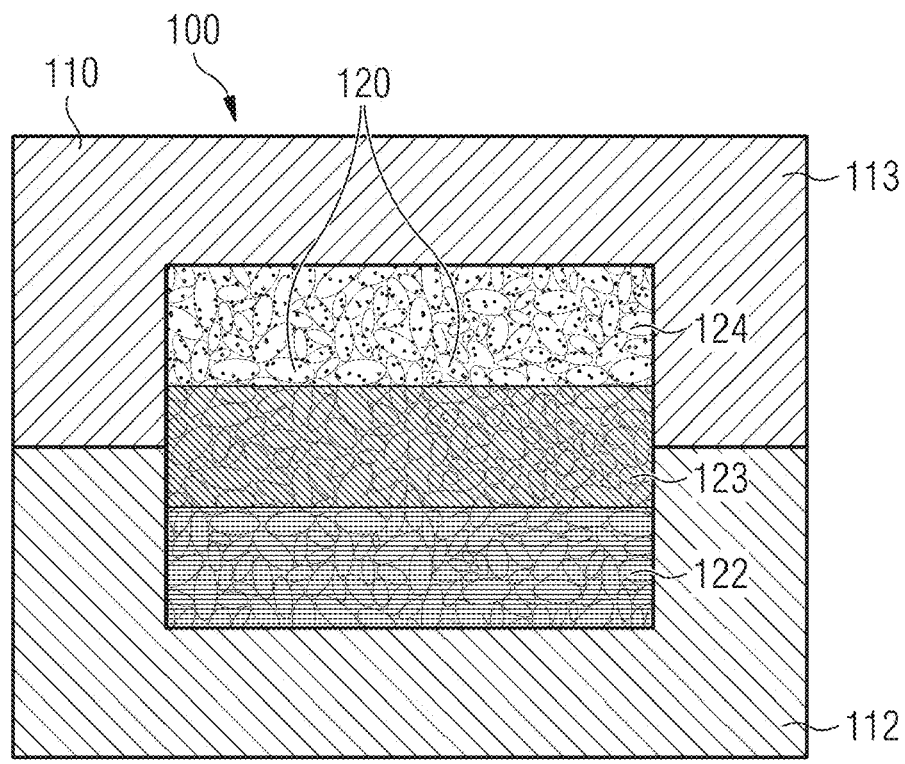

For example, FIG. 1c illustrates the case in which the mold 110 is loaded with three layers 122, 123 and 124 of particles 120, wherein the three layers 122, 123 and 124 each comprise a different amount of energy absorbing material per particle 120. In the case shown here, the bottom layer 122 comprises the largest amount of energy absorbing material per particle 120 and the top layer 124 the smallest amount. As already mentioned, the amount of energy absorbing material per particle 120 may also vary in a different manner within the mold 110, in order to adjust the desired degree of the fusing of the surfaces of the respective particles 120 locally.

The energy absorbing material may, for example, comprise water or be comprised of water, or it may be comprised of a material which comprises a metal, for example a metal powder like iron filings. The choice of the energy absorbing material may depend on the way in which the energy that leads to the fusing of the surfaces of the particles 120 is supplied.

Speaking of which, the method 100 may further comprise the fusing of the surfaces of the particles 120 by supplying energy, wherein the energy is supplied in the form of at least one electromagnetic field 130, 140. The cycle time for a fusing step depends on various parameters (for example, the density of the particles 120) and may be optimized to be within a desired range. A benefit of the process is that the fusing step may be made very short, for example, the cycle time for a fusing step may be in the range from 5 seconds to 2 minutes. This means that, compared to conventional steam molding of eTPU/particle foams for, e.g., sporting goods, the cycle times may be significantly shorter.

It is to be noted that the method of manufacturing may also involve measuring a state of the mold 110, as well as the various components. In particular, a temperature of the particles 120 in one or several places within the mold 110 may be measured. This is beneficial to optimize the cycle time and to adjust the parameters (such as electromagnetic radiation) to obtain a reliable fusing of the particles 120.

Figure 1D:
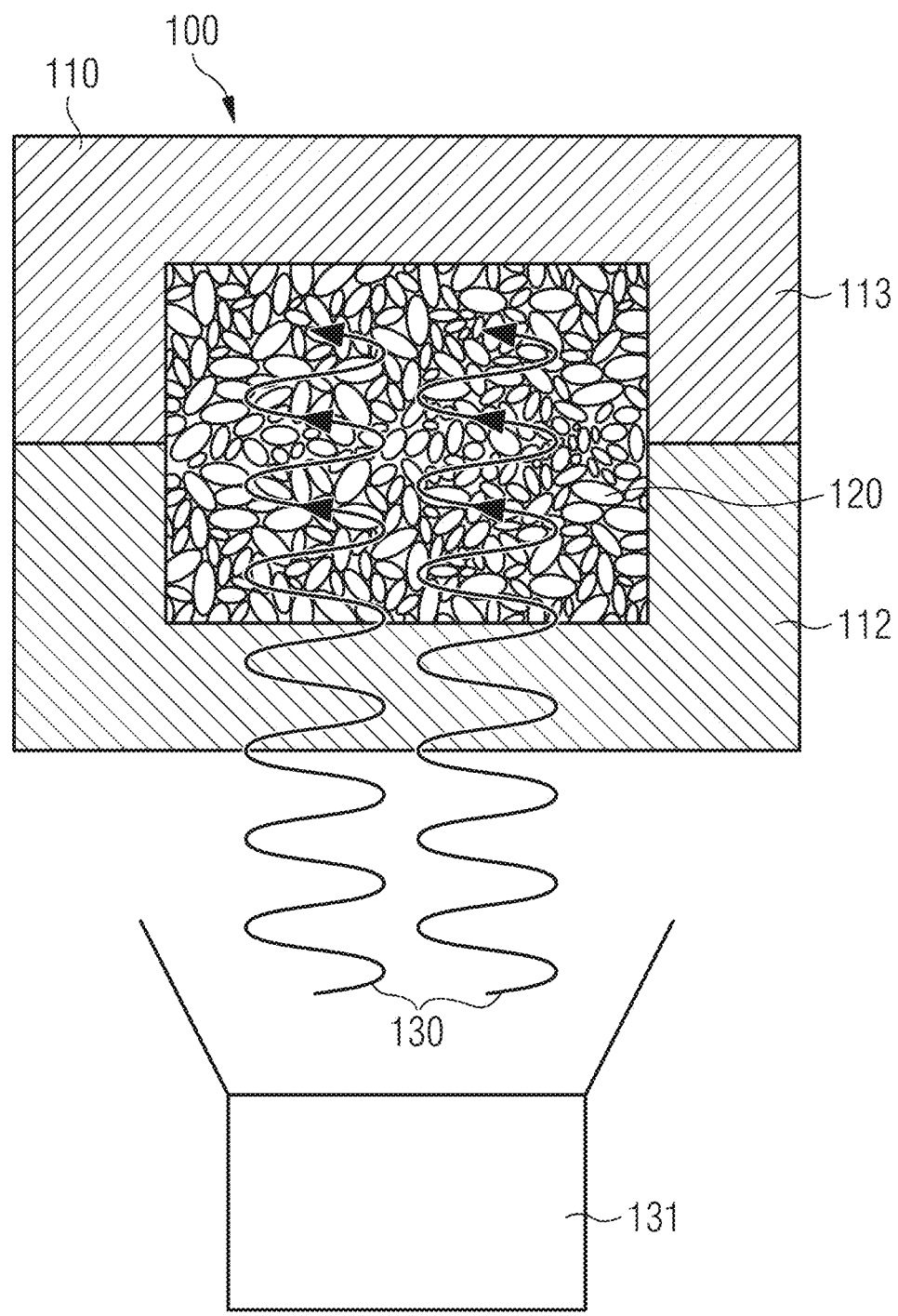

The energy may, for example, be supplied in the form of electromagnetic radiation 130, as shown in FIG. 1d. Herein, the radiation 130 may be emitted from a radiation source 131.

The radiation 130 may, for example, be radiation 130 in the microwave range, i.e. radiation with a frequency in the range from 300 MHz to 300 GHz. The radiation 130 may also be radiation in the radiofrequency range, i.e. radiation with a frequency in the range from 30 kHz to 300 MHz.

In some embodiments, the energy is supplied in the form of radiation 130 in a frequency range different from the frequency ranges just mentioned. As a specific example, the energy may be supplied in the form of infrared (IR) radiation 130. The use of ultraviolet (UV) radiation 130 may also be considered.

If the radiation 130 is radiation in the microwave range, water may be well suited as an energy absorbing material, because irradiating water with microwave radiation leads to a heating up of the water. Also for radiation 130 in the radiofrequency range or infrared range, water may be considered as energy absorbing material.

As shown in FIG. 1e, the energy may further be supplied by electromagnetic induction. To this end, an induction generator 141 (and in some embodiments, multiple induction generators) generates an electromagnetic field 140 which comprises a magnetic flux Φ that varies over time. When using electromagnetic induction, the particles 120, in some embodiments, comprise an energy absorbing material that possesses a certain electric conductivity, for example a metal powder like iron filings. Then, the time varying magnetic flux Φ can create eddy currents in this electrically conducting material which heat up the material and hence contribute to the fusing of the surfaces of the particles 120.

In the embodiments shown in FIGS. 1d and 1e, all partial regions of the mold 110 are provided with approximately the same amount of energy in the form of the electromagnetic fields 130, 140. It must be kept in mind, however, that the amount of energy that is supplied to the particles 120 for the fusing of the surfaces, i.e. the amount of energy that is actually absorbed by them, does not only depend on the amount of energy that is made available by the electromagnetic fields 130, 140 in the first place, but also on the percentage of the available energy that the particles 120 actually extract from the electromagnetic fields 130, 140. As already explained above, this may be controlled by providing the particles 120 with an energy absorbing material or by varying its dosage in different partial regions of the mold 110, for example.

As a further option, the mold 110 or mold parts 112, 113 may be selectively provided on their inside (i.e. the side facing the molding cavity 115) with areas that absorb electromagnetic radiation more strongly such that, when the electromagnetic radiation is applied, the areas absorbing the radiation more strongly heat up in such a way that in this area the particles 120, and hence the surface of a particle foam component, are more strongly melted than in the remaining areas. These areas which absorb electromagnetic radiation more strongly may be provided with the shape of a specific mark, logo or the like, so that this shape is formed in the finished particle foam component by melting the surface of the particle foam component. In this way a marking may be provided on the particle foam component, without the need for a separate processing step.

Alternatively or in addition, in some embodiments, the amount of energy supplied to the particles 120 is influenced by varying the amount of energy that is made available by the electromagnetic fields for the different partial regions of the mold in the first place.

Figure 1F:
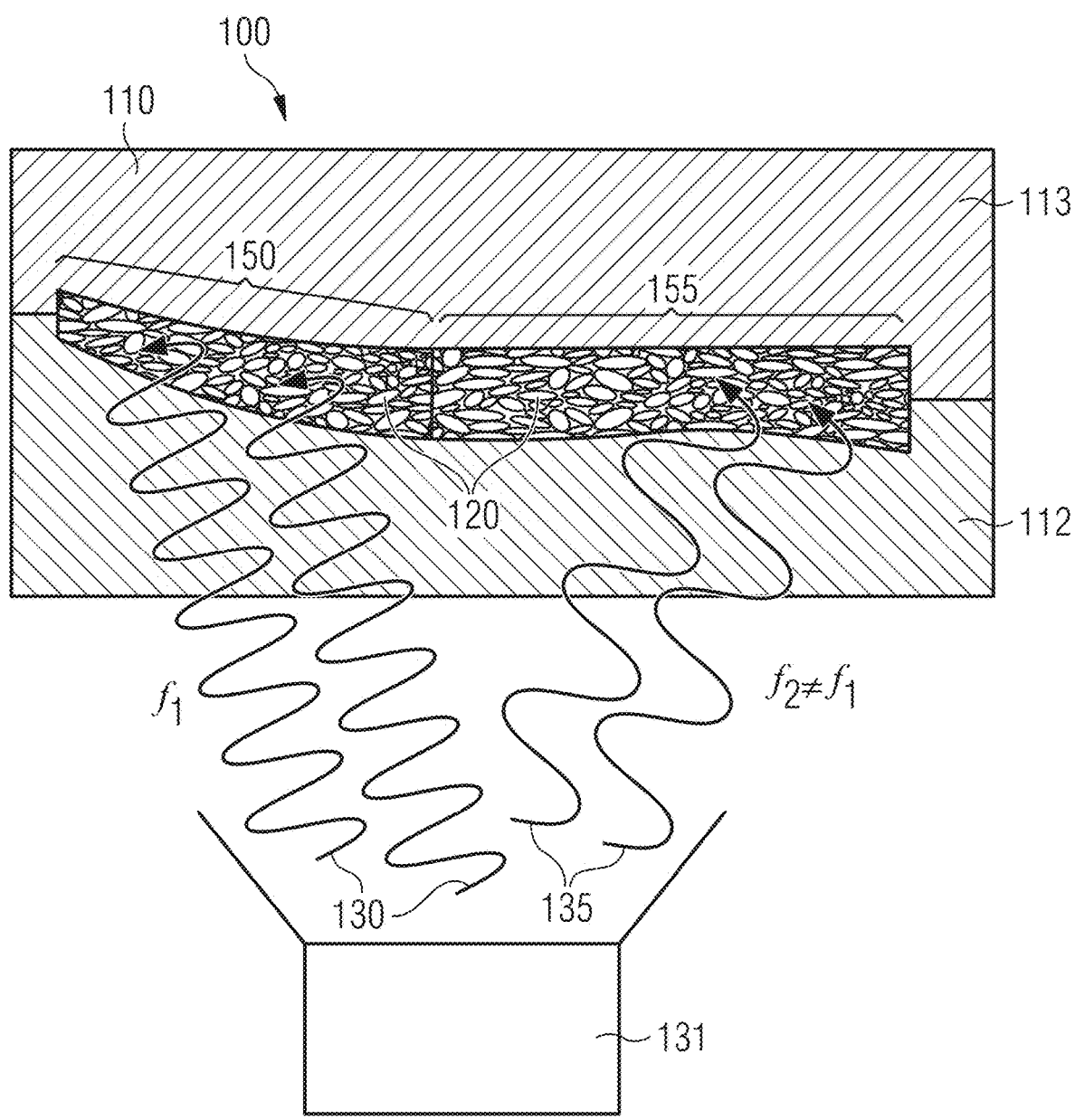
Figure 1G:
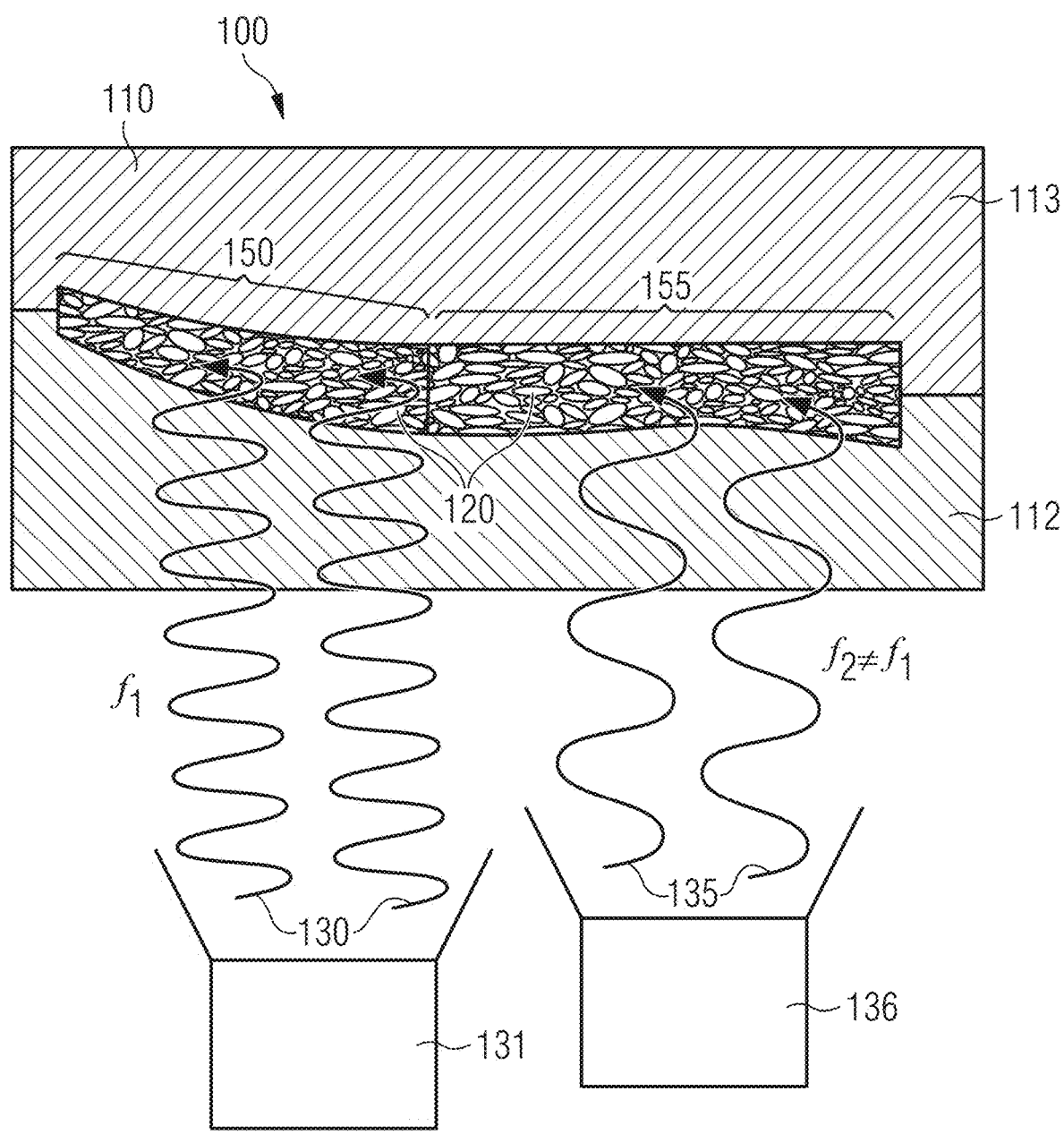

For example, FIGS. 1f and 1g show embodiments wherein more energy is made available in a first partial region 150 of the mold 110 than in a second partial region 155. This is achieved in that the first partial region 150 is irradiated with electromagnetic radiation 130 with a frequency $f_1$ and the second partial region 155 is irradiated with electromagnetic radiation 135 with a frequency $f_2$, wherein the frequency $f_1$ is higher than the frequency $f_2$. Both frequencies $f_1$ and $f_2$ may, for example, be chosen from the above mentioned frequency ranges (microwaves, radio waves, infrared, UV) or from at least one different frequency ranges. As a result, the radiation 130 "transports" more energy into the first partial region 150 of the mold 110 than the radiation 135 transports into the second partial region 155 of the mold 110.

As shown in FIG. 1f, in some embodiments, both kinds of radiation 130 and 135 are emitted from a single radiation source 131. To this end, the radiation source 131 may, for example, comprise a device for doubling the frequency. In some embodiments, however, as shown in FIG. 1g, each of the two kinds of radiation 130 and 135 is emitted from a respective separate radiation source 131 and 136. The radiation may be generated by a suitable radiation source comprising a circuit for guiding the electromagnetic waves. If the resonance frequency is used, the maximum power may be transferred.

Influencing the available amount of energy by a variation of the frequency is, however, not the only option. FIG. 1h, for example, shows embodiments wherein the amount of energy made available for the partial regions 150 and 155 of the mold 110 is controlled via the intensity of the radiation 130 and 135 incident in these regions. Here, intensity designates the incident amount of energy per unit area and unit time of the electromagnetic radiation. In general, it is proportional to the square of the amplitude of the incident radiation.

As mentioned previously, in some embodiments, the particles 120 may be pre-heated prior to the actual fusing of the particles 120. In this way, the particles 120 may be heated to a specific temperature first so that they are, in some embodiments, in a designated absorption range with respect to the electromagnetic radiation that is subsequently applied for the fusing. This pre-heating can take place in the mold 110 or before or during loading of the particles into the mold 110.

Similar to the use of an energy absorbing material described above, pre-heating the particles can, for example, be used when trying to balance the RF absorption of multiple materials in one component, as it might help to achieve operation within an ideal processing range, whereby at least one material has its processing window adjusted so that an optimum processing window for the whole process may be found.

Pre-heating the particles 120 may be beneficial if it is done already during the loading step, but also while the mold 110 is being closed. Such pre-heating can increase the throughput of the system because the time that is required for the actual fusing step, and therefore the time needed for keeping the particles 120 in the mold 110, may be reduced.

Additionally or alternatively, in some examples, RF radiation may be applied at a first, lower, electric power or electric voltage (e.g., during loading and/or when the particles 120 are in the mold 110) in order to pre-heat the material to a specific temperature. Thereafter, the electric power or electric voltage may be increased, either gradually or abruptly. The electric power or electric voltage may be applied at lower values before it gets increased at different partial regions (e.g., regions 150, 155) of the mold 110. Thus, only a partial pre-heating of the particles 120 may be obtained. This may be helpful when using particles 120 having different properties (e.g., size or absorbing material).

The electric power or electric voltage of the electromagnetic radiation 130, 135, 140 may also be increased gradually. For example, a ramp up of the radiation power may be chosen such that the complete cycle time for the production of a single component lies within a desired range for production. For example, in the range of 5 sec-2 min. Compared to conventional methods for the manufacture of sporting goods, the inventive method can thus be significantly faster. In general, ramp up time of the radiation power may be chosen quite freely and it may be adjusted in order to control the fusion process of the surfaces of the particles 120 and, thus, the overall fusion of the component. For example, depending on material of the particles 120, too fast a ramp up might damage the cell structure of the particles. While too slow a ramp up may be inefficient or lead to subpar fusion results.

After the pre-heating, the electromagnetic radiation 130, 135, 140 may be applied to achieve an optimum transfer of power. This approach may also be helpful if materials are used which comprise a temperature dependent dielectric loss factor.

While in the embodiments shown in FIG. 1h both kinds of radiation 130 and 135 have the same frequency $f_1$ and the radiation 130 has the intensity I1 that is higher than the intensity I2 of the radiation 135, it is clear to the skilled person that, in other embodiments, a variation of the intensity may be combined with a variation of the frequency, and that generally more than two different kinds of radiation may be used.

Reference is further made to the fact that also for the creation of two or more radiations 130, 135 with different intensities, a single radiation source may be used. However, in FIG. 1h the radiation 130 with the higher intensity I1 is emitted by the radiation source 131 and the radiation 135 with the lower intensity I2 is emitted from the separate radiation source 136.

In addition, in the embodiments shown in FIGS. 1f-h, the first radiation 130 only irradiates the first partial region 150 and the second radiation 135 only the second partial region 155. However, in different embodiments (not shown), a first electromagnetic field, for example the electromagnetic field 135 from the source 136, provides the entire mold 110 with a basic amount of energy as a base field and an increase in the energy made available in one partial region of the mold 110, e.g. an increase of the energy made available in the partial region 150, is achieved by irradiating this partial region with radiation from an additional radiation source, e.g. with the radiation 130 from the source 131. In other words, individual partial regions of the mold 110 may be provided with additional energy by additional electromagnetic fields, e.g. in the form of radiation or electromagnetic induction.

Reference is again made to the fact that the amount of energy actually supplied to and absorbed by the particles 120 in general also depends on further factors, in particular the amount of potentially added energy absorbing material and the absorbing power of the expanded material of the particles 120 itself.

It is again highlighted that a benefit of the present method 100 may be that the mold 110 only absorbs a limited amount of energy compared to the first material with the particles 120. For example, the use of epoxy resin for the manufacture of molds 110 has turned out beneficial. Epoxy resin may be processed to molds 110 with complexly shaped cavities 115 and it can comprise a low absorption power with respect to electromagnetic fields. Other methods known in the art for the manufacture of a mold with low absorption capabilities may also be used.

A ratio of the amount of energy absorbed by the first material with the particles 120 divided by the total amount of energy which is absorbed by first material and the mold 110 may lie in the range 1.0-0.2, or in the range 1.0-0.5, or even better in the range 1.0-0.8. The exact value of this ratio will, in general, depend on a plurality of factors like, for example, the material used for the manufacture of the mold 110, its mass, and the kind of electromagnetic field(s) used. The higher this ratio is, the higher the amount of energy that is utilized for fusing the particle 120 and the lower the amount of energy that is "lost" in the mold 110.

Further embodiments are shown in FIG. 1i, wherein the mold 110 was further loaded with a second material 160 which remains essentially unaltered by the used electromagnetic field 140. "Essentially unaltered" may mean that the amount of energy absorbed by the second material 160 is not enough to melt or start melting the second material 160 or to soften or harden it.

While in the embodiments shown in FIG. 1i the energy is supplied via electromagnetic induction 140, reference is made to the fact that the following explanations also apply when supplying the energy by a different electromagnetic field, for example via electromagnetic radiation like the radiations 130 or 135. For reasons of conciseness, reference is made to the electromagnetic field 140 in the following.

The second material 160 may, for example, in itself comprise a low absorption power with regard to the used electromagnetic field 140. In particular, the second material 160 may be free from energy absorbing material or comprise a lower content of energy absorbing material than the first material with the particles 120. The second material 160 may, for example, also comprise particles of an expanded material like eTPU, ePA and/or ePEBA, but without or with less energy absorbing material.

The particles of the second material may be randomly arranged. Or, the particles or at least some of the particles of the second material may be aligned to each other or be otherwise intentionally arranged within the mold 110.

The second material 160 may also comprise a different foamed or un-foamed plastic material. The second material 160 may, for example, comprise foamed ethylene-vinyl-acetate (EVA).

Optionally, the mold may also be loaded with further materials, in particular with further materials which also remain essentially unaltered by the electromagnetic field 140. For example, in the embodiments shown in FIG. 1i, the mold 110 was loaded with a third material 165 which remains essentially unaltered by the electromagnetic field 140. The third material 165 may, for example, be rubber. With regard to such further materials, the considerations made with respect to the second material 160 analogously apply.

In the embodiments shown in FIG. 1i, the first material with the particles 120, the second material 160, and third material 165 are arranged in a layered manner. The skilled person will understand, however, that the first material, the second material 160, and potential further materials may also be arranged in a multitude of different arrangements within the mold 110. Hence, the inventive method 100 allows the manufacture of many differently shaped plastic components.

The shape of the mold 110 and the positioning of the first material with the particles 120 as an intermediate layer between a top layer with the second material 160 (for example foamed EVA) and a bottom layer with the third material 165 (for example rubber) as shown in FIG. 1i may be well suited for the manufacture of a cushioning element for sports apparel, e.g. a shoe sole or a part thereof. A shoe sole manufactured in this way may then be further processed to a shoe, for example a sports shoe.

Further, the manufacturing method 100 may also involve a step of stabilizing the particle foam component after fusing. This may be done by keeping the component in the mold 110/tool after fusing so that the component maintains the desired part shape. In some examples, the component can also be actively cooled to accelerate the stabilization of the component. Active cooling may involve supplying ambient air or some gaseous or liquid coolant. The mold 110 may also comprise cooling channels or cooling ribs for this purpose.

The method 100 may also comprise the step of demolding the component, a step which may be carried out in a separate demolding station. In some examples, the demolding may be carried out by taking the molding parts 112, 113 apart from each other. Also, demolding tappets may be provided for demolding, by which the component is pushed out of one of the two molding parts 112 and 113.

Finally, reference is again made to the fact that when performing the method 100, the options and design selections discussed herein may be combined with one another arbitrarily, and the embodiments explicitly discussed herein only provide some specific examples to facilitate the understanding of the invention. The inventive method 100 may, however, not be limited to the embodiments explicitly described herein.

Figure 2A:
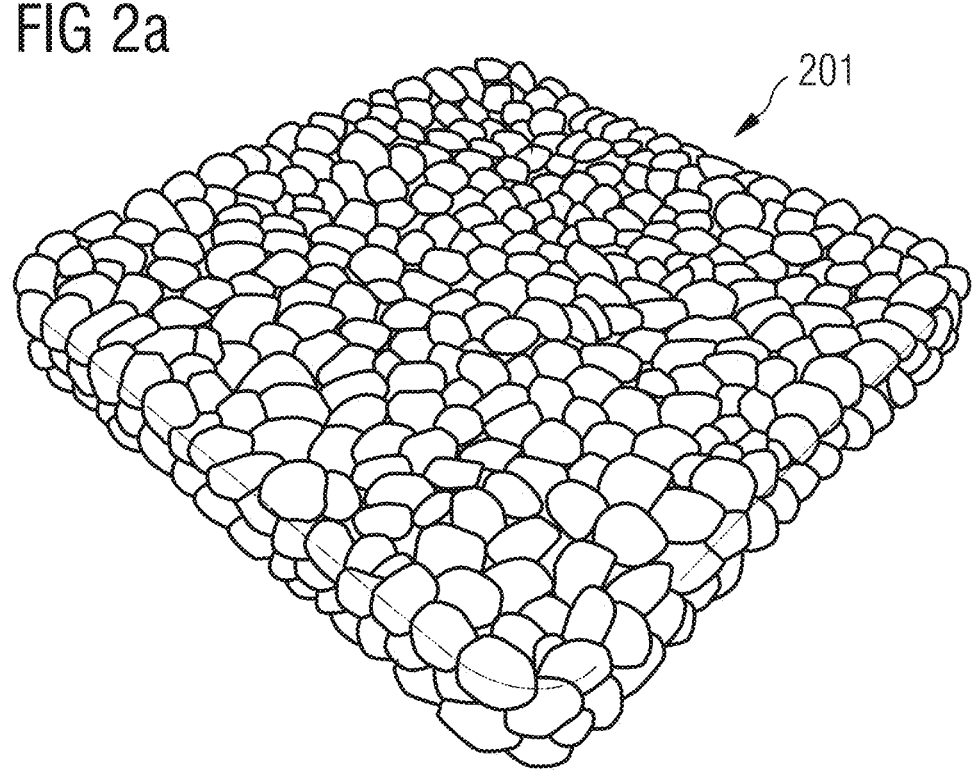
FIGS. 2a-c are perspective views of plastic components manufactured according to an exemplary manufacturing method according to certain embodiments of the present invention.
Figure 2B:
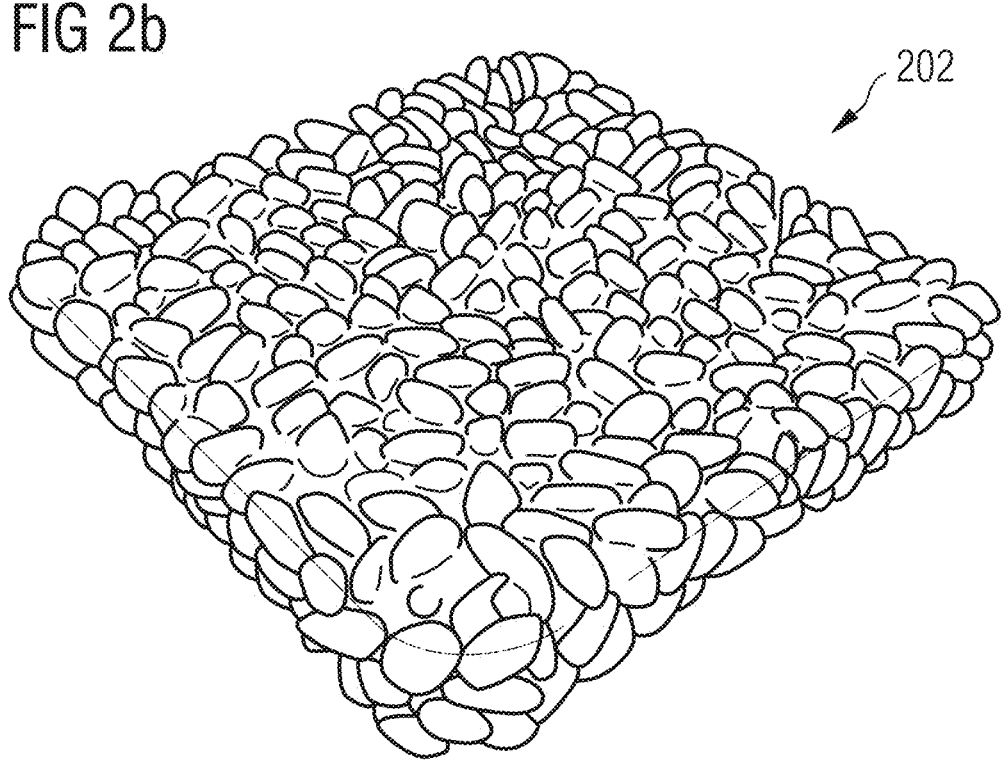
Figure 2C:
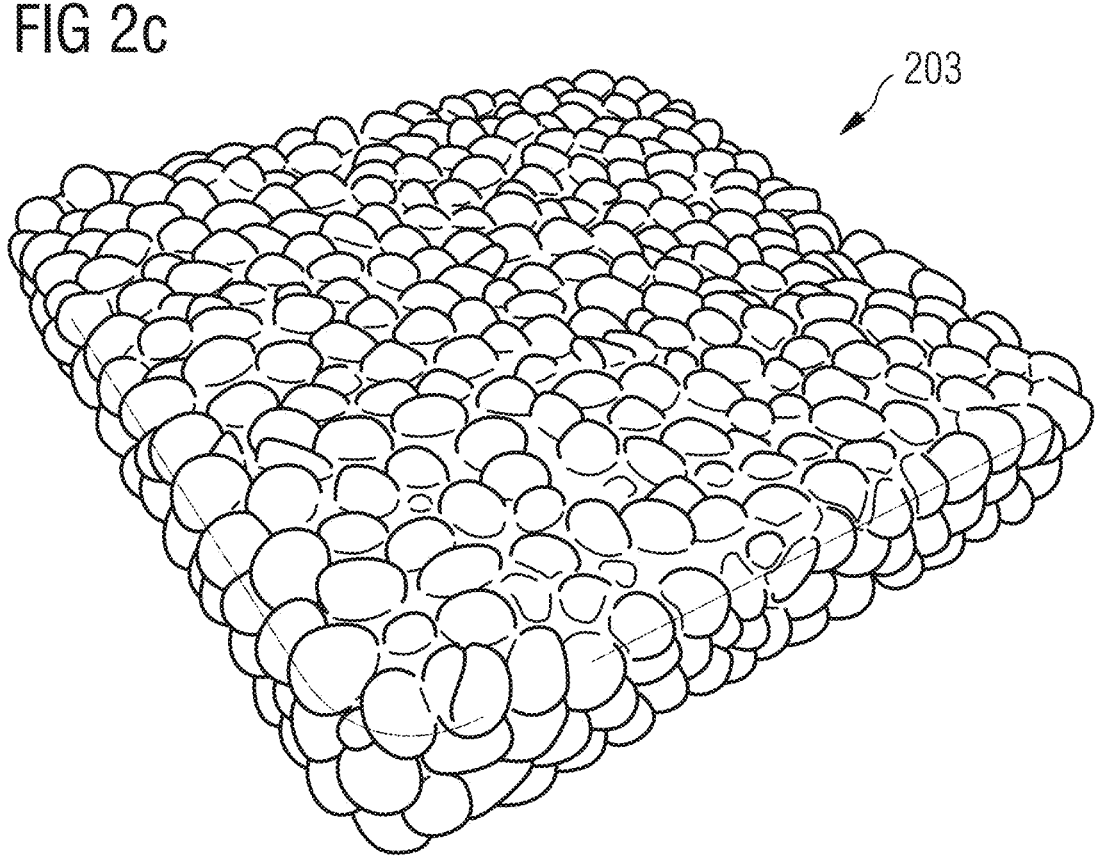

FIGS. 2a-c show exemplary plastic components 201-203 that may be manufactured according to the methods described herein. Therein, plastic component 201 comprises particles of ePEBA, whereas plastic components 202-203 each comprise particles of eTPU.

It is noted that some edges of the plastic components 201-203 as shown in FIGS. 2a-c have been cut such that not all edges have a surface structure as created by fusing the plastic components in a mold.

Figure 3:
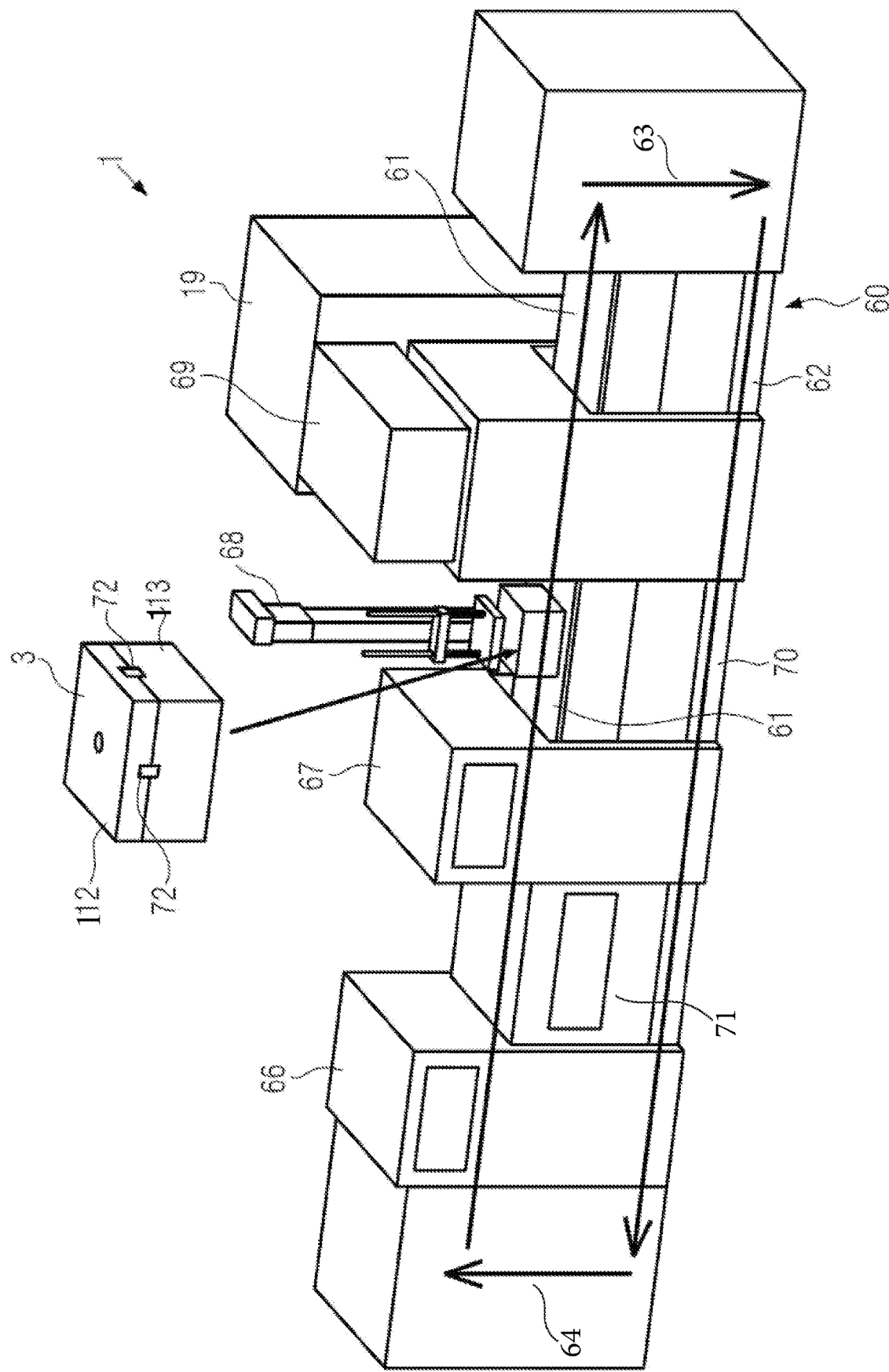
FIG. 3 is a perspective view of an apparatus for the manufacture of particle foam components according to certain embodiments of the present invention.

Embodiments of an apparatus 1 for the manufacture of particle foam components is now explained below with the aid of FIG. 3. This apparatus 1 has several workstations, spatially separate from one another and connected to one another by a conveyor unit 60. With the conveyor unit 60, several molding tools 3, each defining a molding cavity, may be moved between the individual workstations.

The conveyor unit 60 has an upper conveyor section 61 and a lower conveyor section 62, on which the molding tools 3 are conveyed in different directions. The two conveyor sections 61, 62 are arranged parallel to one another, and at the ends of the two conveyor section there is in each case a lifting device 63, 64 by which the molding tools 3 may be moved downwards (lifting device 63) or upwards (lifting device 64) between the conveyor levels. The two conveyor sections 61, 62 each have two narrow conveyor belts, arranged parallel to one another and on which the molding tools 3 may be placed.

Located on the upper conveyor section 61 are, in the direction of conveyance, a demolding station 66, an insertion station 67, a filling station 68 and a welding station 69. The welding station 69 includes a press with a stationary bottom plate, at the level of the upper conveyor section 61, and a movable top plate. Between the two plates (not depicted), in each case a molding tool 3 may be arranged and, by a press, the two plates are actuated, i.e. pressed together. The two plates are made of an electrically conductive material. The bottom, stationary plate is connected to the ground. The top, movable plate is connected to an RF generator 19. The two plates thus form capacitor plates which accommodate the molding tool 3 between them.

Provided on the lower conveyor section 62 is a cooling section 70, on which the molding tools 3 heated at the welding station 69, and the particle foam components located therein, may cool down. The cooling section 70 is able to cool the molding tools 3 with ambient air alone, but may be provided with a fan, in order to subject the molding tools 3 to a cooling airflow and/or may include a cooling chamber which is cooled below room temperature by a cooled medium, in order to accelerate the heat-transfer out of the molding tool 3. The cooling section 70 may hold several molding tools 3 simultaneously, since the cooling and/or stabilizing of the particle foam component in the molding tool 3 is the working step of longest duration.

Provided on the lower conveyor section 62 is a molding tool storage system 71 which is connected to an automatic store for the storage of several molding tools 3, so that different molding tools 3 may be fed into and taken out of the conveyor unit 60 automatically.

The manufacture of a particle foam component finishes in the demolding station 66, in which the molding tool 3 comprised of two halves is opened and the particle foam component produced therein is removed and discharged.

The molding tools 3 have a closing mechanism 72, by which the two halves of the respective molding tool 3 are firmly closed together when conveyed along the conveyor unit 60. This closing mechanism 72 is opened automatically in the demolding station 66 for demolding of the particle foam component, after which the two mold halves are put together again and joined together by the closing mechanism 72. The closing mechanism 72 joins the two mold halves so firmly that they do not move apart during conveyance. The closing mechanism 72 may have a degree of play, so that the two mold halves may be pulled slightly apart during filling, in order to form a crack-gap. The closing mechanism 72 must not be used to absorb the pressure occurring in the molding cavity during welding. This pressure is drawn off via the press in the welding station 69.

The benefit of this apparatus 1 is that a very high throughput is possible with a single welding station 69, since the welding of a particle foam component generally lasts no longer than 30 seconds to 2 minutes. The working step of longest duration is the stabilizing or cooling down of the molding tool 3 and the particle foam component contained within it. Since the cooling section 70 is able to hold several molding tools 3 simultaneously, several molding tools 3 may be stabilized or cooled at the same time. This means that the processing of the molding tools 3 into the welding station 69 is not delayed.

A further benefit of this apparatus 1 lies in the fact that different molding tools 3, in particular with different molding cavities, may be circulated simultaneously. In some embodiments, each molding tool 3 is provided with a unique machine-readable identification device. Such an identification device may be for example a barcode or an RFID chip. At least one suitable readers for reading the identification device are provided on the apparatus 1 along the conveyor unit 60, so that a control unit (not depicted) knows which molding tool 3 is present at which workstation. By this, the molding tools 3 may be dealt with individually. In particular, at the welding station 69, they may be subjected to electromagnetic waves of different voltage and/or duration. The dwell time in the cooling section and the cooling effect under active cooling, for example using a fan, may be individually controlled.

In comparison with a conventional apparatus for the manufacture of particle foam components, in which the foam particles are welded solely with hot steam, the present apparatus 1 is much more compact and much more flexible, since it is able to process several different molding tools 3 simultaneously. Moreover, energy may be introduced into the molding cavity with much greater efficiency by the electromagnetic radiation.

It may also be expedient to provide at the welding station 69 a water or steam supply line, by which water and/or steam may be fed to the molding tool 3. This is especially desirable when the foam particles to be welded have, at low temperatures or generally, only a low dielectric loss factor. In such a case, a limited amount of water or steam is supplied. By the electromagnetic radiation, the water is heated to steam, or the steam is heated further. In this way, the foam particles are heated to a higher temperature at which the dielectric loss factor is greater, so that the electromagnetic radiation is absorbed and they are heated further. It has been found that just a few hundred grams of water are sufficient for a molding cavity with a volume of 50 liters. If the foam particle material is, for example, ePS (expandable polystyrol), then 300 g of water or less are sufficient for heating and welding the foam particles in a molding cavity with a volume of 50 liters. In conventional welding, in which the foam particles are heated solely by hot steam, amounts of steam comprising several kilos of water are needed for a molding cavity with a volume of 50 liters.

It therefore applies, in principle, if foam particles are to be welded which absorb electromagnetic radiation to only a limited extent, that a single addition of water amounting to 300 g is sufficient for a molding cavity with a volume of 50 liters. For many materials which absorb electromagnetic radiation only slightly, even small amounts of water may be adequate. For molding cavities with different volumes, the maximum amount of water required may be matched to the volume in the same proportion.

If water is heated in the molding cavity using electromagnetic radiation, then it is expedient to use a molding tool 3 which has a pressure sensor, by which the pressure prevailing in the molding cavity may be measured. This pressure is proportional to temperature. The irradiation of electromagnetic radiation is then controlled, in some embodiments, in accordance with the measured pressure value, i.e. set for a specific pressure value.

For this apparatus 1 with the conveyor unit 60, the different aspects of the invention described above and in particular the different molding tools and embodiments of the method 100 may be used individually or in combination.

In the following, further embodiments are provided to facilitate the understanding of the invention:

1. Method for the manufacture of a plastic component, in particular a cushioning element for sports apparel, comprising:
   a. loading a mold with a first material which comprises particles of an expanded material; and
   b. fusing the surfaces of the particles by supplying energy,
   c. wherein the energy is supplied in the form of at least one electromagnetic field.

2. Method according to the preceding embodiment 1, wherein the particles comprise one or more of the following materials: expanded thermoplastic polyurethane, eTPU; expanded polyamide, ePA; expanded polyetherblockamide; ePEBA.

3. Method according to any one of the preceding embodiments 1-2, wherein the particles further comprise an energy absorbing material, which absorbs the energy supplied by the at least one electromagnetic field such that the energy absorbing material contributes to the fusing of the surfaces of the particles.

4. Method according to the preceding embodiment 3, wherein the particles are provided with the energy absorbing material prior to the loading of the mold.

5. Method according to any one of the preceding embodiments 3-4, wherein the energy absorbing material comprises water.

6. Method according to any one of the preceding embodiments 3-5, wherein the energy absorbing material comprises a metal.

7. Method according to any one of the preceding embodiments 1-6, wherein the energy is supplied in the form of radiation in the microwave range, 300 MHz-300 GHz.

8. Method according to any one of the preceding embodiments 1-7, wherein the energy is supplied in the form of radiation in the radio frequency range, 30 kHz-300 MHz.

9. Method according to any one of the preceding embodiments 1-8, wherein the energy is supplied by electromagnetic induction.

10. Method according to any one of the preceding embodiments 1-9, wherein more energy is supplied to the particles in a first partial region of the mold than in a second partial region of the mold.

11. Method according to any one of the preceding embodiments 1-10, wherein energy is supplied to the particles in a first partial region of the mold with an electromagnetic field with a first frequency ($f_1$) and in a second partial region of the mold with an electromagnetic field with a second frequency ($f_2$), wherein the second frequency ($f_2$) is different from the first frequency ($f_1$).

12. Method according to any one of the preceding embodiments 3-11, wherein the average amount of energy absorbing material per particle varies within the mold.

13. Method according to any one of the preceding embodiments 1-12, wherein the mold is further loaded with a second material, which remains essentially unaltered by the at least one electromagnetic field.

14. Method according to the preceding embodiment 13, wherein the second material also comprises particles of an expanded material, in particular particles of eTPU, ePA, and/or ePEBA.

15. Method according to any one of the preceding embodiments 1-14, wherein a ratio of the amount of energy absorbed by the first material to the total amount of energy absorbed by the first material and the mold lies in the range 1.0-0.2, preferably in the range 1.0-0.5, and particularly preferably in the range 1.0-0.8.

16. Method according to any one of the preceding embodiments 1-15, wherein the mold comprises an epoxy resin.

17. Plastic component, in particular cushioning element for sports apparel, manufactured with a method according to any one of the preceding embodiments 1-16.

18. Shoe, in particular sports shoe, with a cushioning element according to embodiment 17.

19. Shoe according to embodiment 18, wherein the shoe is a running shoe.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for the manufacture of a plastic component, the method comprising:
   a) pre-heating at least part of the walls of a mold;
   b) loading the mold with particles of an expanded material;
   c) fusing the surfaces of the particles to form a plastic component by supplying energy to the mold, wherein the energy is electromagnetic radiation;
   d) wherein the fusing is conducted in the absence of steam; and
   e) wherein the energy is supplied by an electromagnetic field that is varied over time.

2. The method according to claim 1, wherein the particles comprise one or more of the following materials: expanded thermoplastic polyurethane, eTPU; expanded polyamide, ePA; expanded polyetherblockamide; ePEBA; and combinations thereof.

3. The method according to claim 1, wherein the mold is pre-heated by passing a fluid around/through the mold.

4. The method according to claim 1, wherein the mold comprises an epoxy resin.

5. The method according to claim 1, wherein the mold comprises PTFE (polytetrafluoroethylene), PE (polyethylene), PEEK (polyether ether ketone), and/or UHMWPE (Ultra-high-molecular-weight polyethylene).

6. The method according to claim 1, wherein the mold comprises an insulating layer inside of the mold.

7. The method according to claim 6, wherein the insulating layer comprises PTFE (polytetrafluoroethylene), PE (polyethylene), and/or PEEK (polyether ether ketone).

8. The method according to claim 6, wherein the insulating layer comprises PET (polyethylene terephthalate), PEEK (polyether ketone), POM (polyoxymethylene), polyimides and/or PMMA (polymethyl methacrylate).

9. The method according to claim 6, wherein the insulating layer has a thickness of at least 2 mm.

10. The method according to claim 6, wherein the insulating layer is essentially transparent to electromagnetic radiation.

11. The method according to claim 1, wherein the inside of the mold is covered with a plastic material.

12. The method according to claim 1, wherein the electromagnetic radiation is applied constantly to the mold.

13. The method according to claim 1, wherein the mold further comprises a material applied to a mold surface that has a higher dielectric loss than a material of the mold surface; and wherein the mold is heated to a temperature below the glass transition temperature of the material applied to the mold surface.

14. The method according to claim 1, wherein the mold is pre-heated with heating wires.

15. The method according to claim 1, wherein the mold is formed from a composite material comprising a matrix material having a plastic material and bodies embedded therein.

16. The method according to claim 1, wherein the mold further comprises an energy absorbing material, and wherein the average amount of energy absorbing material per particle varies within the mold.

17. The method according to claim 1, wherein the plastic component is stabilized in the mold after fusing and actively cooled.

18. The method according to claim 17, wherein the plastic component is actively cooled by cooling channels or cooling ribs in the mold.

19. The method according to claim 1, wherein the plastic component is a cushioning element for sports apparel.

20. A method for the manufacture of a plastic component, the method comprising:
   a) pre-heating at least part of the walls of a mold with electromagnetic radiation that is varied over time;
   b) loading the mold with particles of an expanded material;
   c) fusing the surfaces of the particles to form a plastic component with electromagnetic radiation that is varied over time.

* * * * *